US010325515B2

(12) United States Patent
Highet et al.

(10) Patent No.: US 10,325,515 B2
(45) Date of Patent: Jun. 18, 2019

(54) INCREMENTALLY-SIZED STANDARD-SIZED EATING-WARE SYSTEM FOR WEIGHT MANAGEMENT

(71) Applicant: FOQUS, INC., New Smyrna Beach, FL (US)

(72) Inventors: Danuta Highet, New Smyrna Beach, FL (US); Roberta Cahn, Voorhees, NJ (US)

(73) Assignee: Foqus, Inc., New Smyrna Beach, FL (US)

( * ) Notice: Subject to any disclaimer, the term of this patent is extended or adjusted under 35 U.S.C. 154(b) by 450 days.

(21) Appl. No.: 14/860,542

(22) Filed: Sep. 21, 2015

(65) Prior Publication Data
US 2016/0117950 A1   Apr. 28, 2016

Related U.S. Application Data

(60) Division of application No. 13/373,175, filed on Nov. 7, 2011, now abandoned, which is a
(Continued)

(51) Int. Cl.
G09B 19/00 (2006.01)
A47G 19/02 (2006.01)

(52) U.S. Cl.
CPC ....... G09B 19/0092 (2013.01); A47G 19/025 (2013.01)

(58) Field of Classification Search
CPC .......................... G09B 19/0092; A47G 19/025
(Continued)

(56) References Cited

U.S. PATENT DOCUMENTS 1,441,437 A * 1/1923 Lolo .................. A47F 3/145
                                                206/553
1,465,565 A * 8/1923 Scheller ............... C09F 1/00
                                                530/202

(Continued)

FOREIGN PATENT DOCUMENTS

GB        2119633        11/1983
WO    WO 200116921 A1    3/2001

OTHER PUBLICATIONS

"The Diet Plate®—Portion Control Made Easy"—http://www.thedietplate.com.

Primary Examiner — Melba Bumgarner
Assistant Examiner — Joseph B Baldori
(74) Attorney, Agent, or Firm — Dickinson Wright PLLC

(57) ABSTRACT

An incrementally-sized Standard-Sized eating-ware system and process comprise a plurality of formulas to establish and assign Standard Sizes to eating-ware. The Standard Sizes are based on a series of incrementally-sized flat surfaces, and the flat surfaces establish the basis for total volumetric capacity equivalents. The total volumetric capacity equivalents comprise volume inside the eating-ware and directly above the eating-ware. The Standard Sizes are used as a guide to control amount and rate of food consumed. The incrementally-sized Standard-sized eating-ware system and process provide a plurality of incrementally-sized Standard-Sized eating-ware components having successively decreasing Standard Sizes appointed to be utilized in a graduated manner over a period of time and deployed during intervals to provide gradual and unnoticeable food adjustment. The system and process enable the user to modify his/her eating habits for effective weight management while minimizing the perception of change and thereby the emotional impact and/or feelings of deprivation. Numerical and letter representations of Standard Size and Calorie Density Mark are
(Continued)

used to guide the user in selecting eating-ware components in order to maintain, prevent, increase and/or decrease weight.

9 Claims, 9 Drawing Sheets

Related U.S. Application Data continuation-in-part of application No. 11/888,975, filed on Aug. 3, 2007, now abandoned.

(58) Field of Classification Search
USPC .......................... 434/127; 73/426; D7/396.1
See application file for complete search history.

(56) References Cited

U.S. PATENT DOCUMENTS

| | | | | |
|---|---|---|---|---|
| 1,507,968 A * | 9/1924 | Johnson | G01F 19/00 | 73/427 |
| 1,998,969 A * | 4/1935 | Schauer | A61J 7/0023 | 30/324 |
| 2,096,825 A * | 10/1937 | Roman | A47G 19/02 | 126/246 |
| 2,188,744 A * | 1/1940 | Turner | G08B 5/02 | 40/492 |
| 2,526,602 A * | 10/1950 | Crumrine | G01F 19/002 | 206/305 |
| 2,613,537 A * | 10/1952 | Di Addario | G01F 19/002 | 73/426 |
| 2,799,086 A * | 7/1957 | Tupper | G01F 19/002 | 220/DIG. 13 |
| 2,980,280 A * | 4/1961 | Herlow | A47J 27/122 | 206/501 |
| 3,030,812 A * | 4/1962 | Lutz | G01F 19/002 | 30/324 |
| D194,054 S * | 11/1962 | Grossman | D7/556 | |
| D200,867 S * | 4/1965 | Halfley | D7/555 | |
| 3,400,591 A * | 9/1968 | Larson | G01F 19/002 | 30/324 |
| 3,498,136 A * | 3/1970 | Le May | G01F 19/00 | 312/202 |
| 3,526,138 A * | 9/1970 | Swett | G01F 19/002 | 206/514 |
| 3,696,987 A * | 10/1972 | Schuff | B65D 1/265 | 206/520 |
| 3,749,278 A * | 7/1973 | von Boch-Galhau | A47G 19/00 | 206/501 |
| 3,820,684 A * | 6/1974 | Harrison | B65D 1/265 | 206/520 |
| 3,874,085 A * | 4/1975 | Atkins | G01F 19/007 | 33/524 |
| 3,877,577 A * | 4/1975 | Richard | A47G 21/00 | 134/62 |
| 3,968,415 A * | 7/1976 | Hafla | B23Q 1/5468 | 137/596.18 |
| 3,972,118 A * | 8/1976 | Richard | A47G 21/00 | 30/298.4 |
| 4,043,203 A * | 8/1977 | Montesi | G01F 19/002 | 30/324 |
| 4,075,769 A * | 2/1978 | Young | A47G 19/025 | 220/23.8 |
| 4,122,860 A * | 10/1978 | Weisman | G07D 3/10 | 453/8 |
| 4,154,109 A * | 5/1979 | Kelson | G01F 19/005 | 222/469 |
| 4,155,502 A * | 5/1979 | Forte | B65D 71/48 | 206/194 |
| 4,165,565 A * | 8/1979 | Cloutier | G01F 19/007 | 33/524 |
| 4,196,807 A * | 4/1980 | Brom | B65D 71/0007 | 206/197 |
| 4,204,609 A * | 5/1980 | Kuhn | A47G 23/04 | 206/508 |
| 4,218,611 A * | 8/1980 | Cannon | G09B 19/0092 | 377/20 |
| D259,460 S * | 6/1981 | Daenen | D10/46.3 | |
| 4,310,316 A * | 1/1982 | Thomann | G09B 19/0092 | 434/127 |
| D266,820 S * | 11/1982 | Ferrin | D10/46.3 | |
| 4,420,081 A * | 12/1983 | Dart | B65D 1/265 | 206/519 |
| D278,197 S * | 4/1985 | Harper | D7/555 | |
| D278,198 S * | 4/1985 | Harper | D7/555 | |
| D281,849 S * | 12/1985 | Cantor | D7/555 | |
| 4,877,119 A * | 10/1989 | Hosking | G01F 19/00 | 116/227 |
| 4,951,832 A * | 8/1990 | Tenney | B65D 21/02 | 206/505 |
| 4,966,295 A * | 10/1990 | Parrish | A47G 19/025 | 206/459.1 |
| 5,007,743 A * | 4/1991 | Brennan | A47G 19/025 | 206/545 |
| 5,048,688 A * | 9/1991 | Hicks, Jr. | A47J 27/12 | 206/501 |
| 5,065,523 A * | 11/1991 | Chiang | B43L 11/043 | 33/562 |
| D322,541 S * | 12/1991 | Unger | D7/585 | |
| 5,178,416 A * | 1/1993 | Wennik | B42D 1/009 | 281/15.1 |
| 5,184,745 A * | 2/1993 | Havens | A47J 47/02 | 220/23.83 |
| 5,203,703 A * | 4/1993 | Schneiderman | A61J 7/00 | 206/531 |
| 5,328,051 A * | 7/1994 | Potter | B65D 81/3294 | 220/501 |
| D355,735 S * | 2/1995 | Shaffer | D32/53 | |
| 5,419,455 A * | 5/1995 | Russeau | A47G 19/06 | 206/562 |
| D362,160 S * | 9/1995 | Brabeck | D7/643 | |
| 5,454,721 A * | 10/1995 | Kuch | G06F 19/3475 | 434/127 |
| 5,560,653 A * | 10/1996 | Beppu | B42D 15/00 | 283/117 |
| 5,586,656 A * | 12/1996 | Abrums | B65D 21/0233 | 206/501 |
| 5,607,078 A * | 3/1997 | Nordberg | A47G 23/16 | 116/227 |
| 5,611,440 A * | 3/1997 | Møller | A47B 45/00 | 108/181 |
| 5,678,716 A * | 10/1997 | Umiker | B65D 11/1866 | 220/23.83 |
| 5,683,251 A * | 11/1997 | Logan | G09B 29/00 | 273/156 |
| D390,752 S * | 2/1998 | DeCoster | D7/505 | |
| D393,777 S * | 4/1998 | Bernard | D7/500 | |
| 5,769,229 A * | 6/1998 | Andress | B65D 21/0233 | 206/505 |
| 5,799,792 A * | 9/1998 | Abrums | B65D 21/0233 | 206/501 |
| D404,969 S * | 2/1999 | Krenzler | D7/507 | |
| 5,881,597 A * | 3/1999 | Brooks | G01F 19/00 | 73/428 |
| 5,896,990 A * | 4/1999 | Barzana | A61J 7/04 | 116/309 |
| D411,940 S * | 7/1999 | Horvat | D7/505 | |
| 5,938,066 A * | 8/1999 | DeMars | A47G 19/06 | 206/541 |
| D425,378 S * | 5/2000 | Gilbertson | D7/667 | |
| 6,083,006 A * | 7/2000 | Coffman | A23L 1/293 | 128/921 |
| D437,793 S * | 2/2001 | Kaposi | D10/46.2 | |
| D438,125 S * | 2/2001 | Kaposi | D10/46.2 | |
| D440,164 S * | 4/2001 | Kerr | D10/46.3 | |
| D443,836 S * | 6/2001 | Wright | D10/46.3 | |

(56) References Cited

U.S. PATENT DOCUMENTS

| | | | | |
|---|---|---|---|---|
| 6,296,488 B1 * | 10/2001 | Brenkus | | A47G 19/025 206/459.5 |
| D450,605 S * | 11/2001 | Wright | | D10/46.3 |
| 6,318,567 B1 * | 11/2001 | Braley | | A47B 49/004 211/150 |
| 6,415,945 B1 * | 7/2002 | Zank | | A47J 27/12 206/499 |
| 6,457,250 B1 * | 10/2002 | Mingus | | G01N 33/10 33/1 BB |
| 6,488,210 B2 * | 12/2002 | Schumi | | G07F 1/06 235/488 |
| D473,479 S * | 4/2003 | Blair | | D10/46.3 |
| D473,752 S * | 4/2003 | Kerr | | D7/316 |
| 6,585,516 B1 * | 7/2003 | Alabaster | | G09B 19/0092 128/921 |
| D494,012 S * | 8/2004 | Bandy-Helderman | | D7/544 |
| 6,796,430 B2 * | 9/2004 | Mercier | | B65D 21/02 206/505 |
| D504,799 S * | 5/2005 | Lawson | | D7/505 |
| 6,886,694 B2 * | 5/2005 | McNeeley | | B65D 21/02 206/505 |
| D512,604 S * | 12/2005 | Panepinto | | D7/505 |
| 7,044,739 B2 * | 5/2006 | Matson | | G09B 19/0092 434/127 |
| 7,201,579 B1 * | 4/2007 | Boyum | | G09B 19/0092 434/127 |
| D547,119 S * | 7/2007 | Robinson | | D7/505 |
| D548,115 S * | 8/2007 | Sawhney | | D10/46.2 |
| D568,102 S * | 5/2008 | Ruiz De Az a | | D7/316 |
| 7,413,439 B2 * | 8/2008 | Tiessen | | G09B 23/30 434/127 |
| 7,416,094 B2 * | 8/2008 | Sokola, Sr. | | A47G 19/025 220/574 |
| D582,798 S * | 12/2008 | Mantilla | | D10/46.3 |
| D584,968 S * | 1/2009 | Mantilla | | D10/46.3 |
| 7,472,595 B2 * | 1/2009 | Ploix | | A45D 19/00 73/426 |
| D586,623 S * | 2/2009 | Dunn | | D7/541 |
| D593,800 S * | 6/2009 | Hone | | D7/505 |
| 7,603,287 B2 * | 10/2009 | Kargman | | G06Q 20/20 248/442.2 |
| 2002/0055087 A1 * | 5/2002 | Hardesty | | G06F 15/025 434/127 |
| 2002/0108953 A1 * | 8/2002 | Goralnik | | B65D 51/28 220/212 |
| 2005/0011261 A1 * | 1/2005 | Lyon | | G01F 19/00 73/427 |
| 2005/0014111 A1 | 1/2005 | Matson | | |
| 2006/0029698 A1 * | 2/2006 | Watson | | A47G 19/025 426/231 |
| 2006/0073441 A1 * | 4/2006 | Kwan-Hou | | G09B 19/0092 434/127 |
| 2006/0121163 A1 * | 6/2006 | Holloway | | G01N 33/14 426/231 |
| 2006/0160050 A1 * | 7/2006 | Matson | | G09B 19/0092 434/127 |
| 2006/0183086 A1 * | 8/2006 | Brandt | | A47F 5/0043 434/127 |
| 2007/0062045 A1 * | 3/2007 | Sylvie | | G01F 19/002 30/142 |
| 2007/0198332 A1 * | 8/2007 | Beny | | A47G 19/23 705/12 |
| 2007/0289973 A1 * | 12/2007 | Acosta | | A47G 19/025 220/507 |
| 2009/0019709 A1 * | 1/2009 | Fisher | | A47G 21/02 30/344 |
| 2009/0035734 A1 * | 2/2009 | Highet | | G09B 19/0092 434/127 |
| 2009/0084179 A1 * | 4/2009 | Gougian | | G01F 19/00 73/427 |
| 2009/0220924 A1 * | 9/2009 | Smith | | G09B 19/00 434/127 |
| 2009/0286212 A1 * | 11/2009 | Gordon | | A23L 1/293 434/127 |
| 2010/0015580 A1 * | 1/2010 | Morris | | G09B 19/0092 434/127 |
| 2012/0077154 A1 * | 3/2012 | Highet | | G09B 19/0092 434/127 |
| 2014/0045151 A1 * | 2/2014 | Highet | | G09B 19/0092 434/127 |
| 2014/0255884 A1 * | 9/2014 | Highet | | G09B 19/0092 434/127 |
| 2016/0117950 A1 * | 4/2016 | Highet | | A47G 19/025 434/127 |

* cited by examiner

INCREMENTALLY-SIZED STANDARD-SIZED EATING-WARE SYSTEM FOR WEIGHT MANAGEMENT

CROSS-REFERENCE TO RELATED APPLICATIONS

This application is a division of U.S. patent application Ser. No. 13/373,175 filed Nov. 7, 2011, which is continuation-in-part of U.S. patent application Ser. No. 11/888,975, filed Aug. 3, 2007, the disclosure of which are incorporated herein by reference in their entirety.

BACKGROUND OF THE INVENTION

1. Field of the Invention

The present invention relates to an incrementally-sized standard-sized eating-ware system and processes for weight management; and more particularly to an Incrementally-Sized Standard-Sized Eating-ware System, using a plurality of formulas to establish and assign standard sizes to eating-ware, where the standard sizes are based on a series of incrementally-sized flat surfaces, and the flat surfaces establish the basis for total volumetric capacity equivalents, and the total volumetric capacity equivalents comprise volume inside the eating-ware and directly above the eating-ware, and the standard sizes are used as a guide to control amount and rate of food consumed for weight management; and wherein a plurality of incrementally-sized standard-sized eating-ware components have successively decreasing standard sizes to gradually and unnoticeably modify food portions consumed and/or the rate of food consumption, while minimizing the emotional impact on the user; and processes for use of the standard sizes and/or the incrementally-sized standard-sized eating-ware components for weight management and instilling healthy eating habits; and wherein a Caloric Density Mark consisting of a letter representation of food caloric density can be combined with the numeric representation of eating-ware standard size to guide a user while serving and consuming food.

2. Description of the Prior Art

The amount of food served usually determines the amount consumed. Consumers depend on the eating-ware that they are using to determine the amount of food they serve themselves. They are unaware that the size of their eating-ware impacts the amount and the rate that they consume their food. Nor can they determine the total volumetric food delivery capacity of their eating-ware by any currently available means.

Eating-ware components in a form of a flat surface are currently used for serving food and transfer of food directly to the user. Eating-ware components heretofore known and utilized for weight management generally require users to either measure and/or transfer food prior to being able to consume it directly from a flat surface or from any typical eating-ware.

Solid foods can be served extending beyond the rim of a container and eaten during the daily consumption process. Although the volume of food that can be served above the rim of eating-ware is not contained within, it does add to the total volume consumed. No currently devised eating-ware or method takes this and its impact on the daily consumption into account.

The current dietary recommendations require consumers to monitor and calculate their daily consumption vs. recommended amounts, which will vary with their age, gender, built, etc. This is a very complex and time consuming strategy that is difficult to implement for most adults, and especially for children. Currently there are no recommendations for gradually and unnoticeably modifying the amount and rate of consumption nor are there tools that would guide the user in this process to address their individual needs.

Bad eating habits result in overeating. When individuals eat big mouthfuls quickly they are not giving themselves enough time for the body to recognize that food was consumed. As a result, they continue to eat more food than they would have if they were mindful of their consumption.

Many people begin a diet abruptly by immediately reducing their caloric and food intake. Oftentimes these dieters become discouraged when their appetite does not readily adjust to the caloric modifications, and they suffer from feelings of hunger and deprivation. Discomfort and discouragement replace the drive to diet. As a consequence, many would be "dieters" quit their diet altogether or go through yo-yo dieting. Heretofore known and utilized devices fail to take into account the importance of change being gradual and unnoticeable, or fails to allow the user to use typical eating-ware. Instead, heretofore known and utilized devices, systems or elements—drastically alter how a person eats and makes the food restrictions glaringly obvious, which leads to feelings of deprivation and demotivation.

The main focus of the majority of diet devices heretofore proposed is either a focus on the food itself (i.e. calories, fat content, sugar content) or on the individual serving container. These devices do not take into the account that eating is a system of processes. For example, cooking, selection of eating-ware, decision of adequate portion (impacted by size of eating-ware components), selection of utensil-like eating-ware (impacts the rate of consumption unbeknownst to the user). During the process of transferring food from serving-ware into a container from which the food is eaten, the user estimates how much food to serve by visual determination. The planar view of the eating-ware component is a critical factor on the user's estimation of portion size. None of the heretofore disclosed devices or diet methods account for the fact that food portions appear visually smaller on a an eating-ware component with a larger planar view. Eating-ware of the same planar view may have different depths.

Most users are not aware of the fact that plate-like eating-ware can actually have a significant internal volume. A person, unaware, will serve more food on an eating-ware component of same surface dimension in a component that has greater depth. In fact some of the devices are in a shape of a box, which results in a user serving more than they would on a flat surface. In addition using a "device" as opposed to typical eating-ware would make a user more focused on being on a diet and increases the feelings of deprivation.

None of the heretofore known and utilized eating-ware devices give the user an ability to follow a numeric representation of portions on flat surfaces and portions served directly above the eating-ware components.

Moreover, none of the heretofore disclosed devices or diet methods take into account the relative size of eating-ware to other components in a setting during consumption. None of them address the importance of surrounding eating-ware accessories. That's because the focus of these devices is on food itself or they are used to measure and transfer food prior to consumption. Heretofore known and utilized eating-ware devices are not concerned with consumption processes as a system. Typically they consist of devices for measuring food contained within the device, the internal volume only.

Currently heretofore known and utilized eating-ware devices or diet methods generally fail to consider the importance of utensil-like eating-ware components that actually deliver food directly to the user and affect the rate of consumption, which is an important factor in overeating. This is because the devices do not address the most important factor of dieting, the entire eating process.

Surprisingly and unexpectedly, the incrementally-sized standard-sized eating-ware system and processes of the subject invention has determined that the entire consumption process impacts the user's ability to successfully manage their weight.

Most diet plans require a great deal of effort and "willpower" to count calories, attend meetings, choose different foods, or measure and control portion sizes. It is difficult for dieters to maintain this ritual for extended periods of time. Most people can not accurately estimate the calorie content of the substances they consume. A person would need to know the exact quantity of each ingredient in a meal to determine the total calorie intake. Most people therefore make a visual estimation of how much to serve themselves by visually evaluating the amount of food contained on their eating-ware in relation to the size of eating-ware. This is a very inaccurate process due to the variability of typical eating-ware. There is no simple way, such as standard sized eating-ware to guide the user in selecting eating-ware components that actually affect the amount of food served and consumed, and the rate of consumption, to optimize the feeling of satiation and prevent over-eating.

As eating-ware has increased in size, normal food portions served on that eating-ware appear smaller and smaller. In response, users have increased the amount served to compensate for this illusion. No prior art addresses this critical phenomenon.

When selecting the eating-ware there are limited choices of relative sizes within a typical eating-ware set, for example: dinner plate, salad plate, desert plate, bowl, cup. Depending on a manufacturer and/or style, all these items come in a variety of different sizes and configurations. In addition to china-like eating-ware, a consumer typically adds mugs, glassware, utensils and cutlery, and eating-ware accessories to complete a serving setting. Even though visually eating-ware components of the same type may appear similar, they will deliver very different food quantities. Depending on the style or manufacturer of the eating-ware, the internal volume of the eating-ware component and the amount of food that can be served above the upper boundary of component will vary. The user does not have a way of verifying how much total volumetric capacity an eating-ware component has and/or how the different components' total volumetric capacities relate to each other. For example: a flat plate vs. a deep plate vs. a bowl vs. a cup vs. a spoon vs. a fork, etc. No heretofore known and utilized device looks at the total (internal and directly above) volumetric capacity of the eating-ware components and assigns it a numerical equivalency that can be applied across different types and/or styles of components.

Some of the heretofore known and utilized devices remain the same size throughout the diet process, while other heretofore known and utilized devices require measurement and transfer of a food portion. None of the heretofore known and utilized devices take into account the impact on the user of seeing the smaller portion served on typically sized eating-ware. As the portions get smaller the user will feel more and more deprived and therefore more and more discouraged from continuing on his/her weight management program.

The focus of heretofore known and utilized devices is on measuring food or aspects related to its properties. No heretofore known and utilized eating system or process looks at consumption as a system. The importance of visual appearance of the food served relative to the total serve-able surface area, and the impact it will have on satiation and/or consumption is largely ignored by prior art. Further, heretofore known and utilized devices, systems and processes typically do not take into account the rate of consumption that is affected by the total volumetric capacity of utensil-like eating-ware components.

Moreover, heretofore known and utilized devices, systems and methods that have indicia (spoon-like or cup-like) are typically used for measurement of food during preparation. It is not designed for consumption and the marks are used to indicate the internal volume within the mark only.

Experts believe that losing weight slowly is healthier, and that it is important to change eating habits in order to maintain permanent weight loss. Changing eating habits includes not only modifying what an individual is eating, but also altering portion amounts through portion control. Studies show that visual perception influences food consumption. People eat more when given larger portions.

Portion control adjustment over a period of time greatly facilitates healthy weight loss, as the individual's behavior towards foods and portions becomes modified. The ability of an individual to maintain healthy weight is affected by the amount of food they serve themselves and the rate they consume the food. In addition to the size of portion consumed, the rate of consumption impacts the consumer's feeling of satiation. The slower the food is consumed, the more satisfied the user will feel with lesser amount of food. One way to control that is to eat more slowly, and another is to eat less with each mouthful. The heretofore known and utilized devices do not provide a solution for the user to control the amount of food per mouthful.

Moreover, dieting can be very embarrassing in our society and most users prefer to be discreet. However, none of heretofore known and utilized devices or systems can be used at the dinner table with guests without making it glaringly obvious to everyone that the user is dieting. There is a need in the art for a discrete gradual and unnoticeable portion control device and processes which can be utilized when dining with guests, without making the user's diet glaringly obvious.

None of heretofore known and utilized devices and/or systems provide a system that utilizes formulas to determine a standard size for all eating-ware components. Heretofore known and utilized devices and/or systems do not provide a system that can be used by manufacturers to indicate the standard sizes of eating-ware components for the users, so that the users will be able to continue to stay on their weight management regimen no matter what they eat (type of food and/or type of meal), what eating-ware component they eat from (plate, bowl, cup, glass, flat surface, bag, pre-packaged-ware, etc.), what they eat with (fork, knife, spoon, straw, chop sticks, etc.), or where they eat (restaurant, cafeteria, friends home), as long as the users verify the standard size of the eating-ware components that they are using. There is a need in the art to provide a device, system and process that yields these capabilities.

The vast majority of portion control and other dieting devices heretofore disclosed and utilized do not address gradual behavior modifications, and therefore are difficult to utilize over time. That is to say, those dieting devices and processes presently in vogue do not provide gradual portion control devices and discrete behavioral modifications.

Instead, the majority of dieting devices and processes provide abrupt, immediate portion adjustments, which result in feelings of deprivation as the dieter's appetite does not so abruptly diminish. These portion control dieting devices generally involve plates or containers having partitioned or compartmentalized assemblies demarcated by a specific food group appointed to be utilized by a user on a daily basis. None of these devices concern themselves with the fact that solid foods can be served beyond the rim of the container, nor the fact that foods can be served on flat surfaces.

For various examples of these compartmentalized assemblies, see the following: U.S. Pat. No. 4,877,119 to Hosking discloses a drinking-beaker assembly including a collar and volumetric structure that is appointed to serve as both a drinking vessel, especially the drinking of water in the course of a diet, and a device for determining the precise amount of liquid consumed; U.S. Pat. No. 6,296,488 to Brenkus et al. discloses a diet method and apparatus which controls the portion size by providing a plate with a plurality of compartments associated with a meal card; U.S. Design Pat. No. D194054 to Grossman discloses an ornamental design for a plate having three compartments, wherein each of the compartments includes a picture symbol representing the food group which is to be portioned in the respective compartment; U.S. Design Pat. No. D200867 to Haifley discloses an ornamental design for a plate or dish wherein approximately one-half of the structure includes caloric indicia thereon, which does not appear to be utilized for holding food, while the other half seems to be appointed for holding food; U.S. Design Pat. No. D281849 to Cantor discloses an ornamental design for a diet plate that utilizes curved rib portions to apparently form food dividers or compartments to separate food items or portions; U.S. Patent Application Publication No. 2006/0029698 to Watson et al. discloses a food template adapted to be removably applied to a food bearing surface of a food holder, such as a plate to define a plurality of areas for food portions to be placed; Foreign Publication No. GB 2119633 to Mackay discloses a compartmented plate divided into different regions which are marked in a different manner, such as by color coding, to indicate the different types of foods intended to be placed in each region; and "The Diet Plate®—Portion Control Made Easy" found at www.thedietplate.com discloses a weight management system consisting of plates and cereal bowls for a family wherein the plate or cereal bowl includes markings therein to indicate the given food groups and respective portion sizes.

These portion control dieting devices do not resemble eating-ware components that are typically used by most users today, and cannot be applied to typical devices that may be utilized in the future. They are cumbersome and either glaringly announce to the user and his/her companions that the user is on a diet, or force them to measure and transfer food prior to serving for consumption. Further, these portion control devices do not address all aspects of eating-ware one eats from, or eats with, or pre-served prepared sources of food or prepackaged food. These portion devices do not adjust in size in a discrete and gradual manner, at increments so small that the small changes are virtually unnoticeable by the user. Moreover, none of these devices address the rate at which food is transferred directly to the user's mouth. They ignore the fact that a flat plate, a fork or a flat surface has a volumetric capacity to deliver food portions, and that eating-ware with an internal volume also has capacity to deliver solid foods directly above the rim of the eating-ware. None of these devices address the importance of the relative size of all components that make up a setting, nor the need for incrementally-sized standard sized series of eating-ware settings.

Additionally, the indicia used on heretofore disclosed devices and methods are either decorative or used for specifying areas of a plate to be used for particular type of food. None of the indicia is used to help the user select sequential standard sizes of typical eating-ware components which relate to the total volumetric capacity to hold food within and directly above the eating-ware component. None of the heretofore disclosed devices and methods can help a user to size their current or future eating-ware components. The indicia described in heretofore disclosed devices and methods used for measurement generally refer to the volume contained within the indicated mark or within the component. None of the heretofore disclosed devices and methods take into account the volume of food that can be served directly above the eating-ware or the fact that some eating-ware has no internal volume. Depending on the shape of the utensil-like eating-ware component, very different amounts of food can be delivered per each mouthful. None of the heretofore disclosed devices and methods that have these indicia concerns itself with these aspects because the purpose of heretofore disclosed devices and methods is for measurement of ingredients during food preparation and not during consumption.

For repositionable compartmentalized devices see: U.S. Pat. No. 4,966,295 to Parrish, which discloses a compartmentalized dieting plate having a partitioned assembly that divides the plate to form predetermined fluid capacity compartments, and in which the partition assembly may be repositioned to adjust the compartmentalized capacities as a dieters requirements change; and U.S. Pat. No. 5,007,743 to Brennan, which discloses a food metering dish including a dish member with a continuous surrounding wall defining an interior cavity having first and second concave recesses for receiving metered containers there within, the recesses being appointed with ribs with removable partition walls to form compartments for food portions for controlling amounts served.

These types of devices do not change the overall dimensions and/or the visual planar reference the food is served on and are not meant to be eaten from in a daily lifestyle. They may help the user if the food type is such that each ingredient can be separated. Many foods today come as a mixture of ingredients and this type of device would be very cumbersome to use with mixtures. Further, these devices could not easily be used in a work environment or in a restaurant and they do not resemble typically used eating-ware, which would make it glaringly obvious to the user and his/her companions that the user is observing portion restriction.

Aforementioned compartmentalized plates and containers all share numerous disadvantageous stemming from abrupt changes in a person's diet. A portion conditioning incrementally-sized standard-sized eating-ware set is not provided. Rather, these compartmentalized dieting plates utilize dividers to form compartments for holding food to be consumed. As the portion amounts are not gradually, unnoticeably adjusted, but are rather immediate, the user will quickly feel deprived and suffer from hunger as his or her appetite is not gradually adjusted with these devices. Behavior modification is not achieved over a gradual period of time. Moreover, these devices all create a negative emotional impact on the user, as they do not discretely provide portion control mechanism. During a dinner with friends or family it will be highly obvious that the user is on a diet or subject to portion control. Moreover, none of these devices provide the ability to gradually and unnoticeably adjust one's food portions through implementation of an incrementally-sized standard-sized eating-ware set that resembles typical eating-ware components.

Even wherein systems and processes of modifying eating habits of a user are provided, rather than just portion control, these devices fail to provide an eating-ware component set that provides incrementally-sized standard-sized eating-ware components which so resemble regular eating-ware components, that a dieter (as well as others eating with the dieter) can soon forget he or she is practicing portion modification.

These devices fail to provide eating-ware components that look like typical eating-ware. These devices fail to provide a system where the user has the flexibility to eat any type of food and continue to stick to the weight management program. The incrementally-sized standard-sized eating-ware system formulas can be applied to determine standard sizes of existing eating-ware components. These devices fail to provide the user with the ability to continue their weight management program regardless of type of eating-ware components used. There is a need in the art for an incrementally-sized standard-sized eating-ware component system wherein any eating-ware item for eating food from and/or eating food with can be used as long as the formulas are applied to determine the standard size and/or sizes of the eating-ware component. Further, there is a need in the art for an incrementally-sized standard-sized eating-ware component system that can be applied to pre-packaged food eaten directly out of the packaging. None of the heretofore known devices or systems enable a user to continue his/her weight management regimen when eating directly out of pre-packaged containers.

Fluid consumption can greatly add to the total consumption of the caloric intake, especially alcohol, sodas, and fruit drinks. There is no heretofore known device or system that helps to control the gradual decrease in these high calorie consumables through a numerically guided incrementally adjustable system.

For example, U.S. Pat. No. 7,044,739 to Matson discloses a system and processes for modifying eating habits of a user by providing a set of fixed volume graduated containers that are subdivided into sections and provide a user with means to control the volume of food consumed over time. In a weight loss program, a user is provided with a set of the graduated sectioned containers and migrates from measuring the amount of food per meal with a larger fixed volume container to measuring the amount of food per meal with a smaller fixed volume container. Unfortunately, the sectioned containers cannot feasibly be utilized in a discrete manner on a dinner table during regular meals. This has particular impact when one has dinner guests, and/or when a parent is attempting to gradually, and discretely, modify eating habits of a child. Moreover, meals require constant measuring and compartmentalizing food to be consumed. The dieter is constantly burdened with the task of loading each compartment, and is constantly reminded of his or her diet during eating. This device appears to be a deep container, which would make the portions appear even smaller from top view perspective and lead to further feeling of deprivation.

These types of diets make it very difficult for a dieter to eat outside of their home environment. In addition, they cannot be used to control liquids or the rate at which a person consumes food.

Obesity is becoming an epidemic that affects not only adults but also an increasing number of children. Family diet techniques become a necessary prerequisite for addressing weight problems that affect parents and their children when unhealthy eating habits become infused in the home. None of the weight loss or diet devices heretofore disclosed and utilized give parents a simple tool to quickly adjust a child's portion as the child grows, in order to help the child maintain healthy weight. Children of the same age may have drastically different caloric requirements depending on their build and growth spurts, and many other factors. None of the weight loss or diet devices heretofore disclosed and utilized address this important issue of giving parents and children a simple tool like a number system to follow when selecting their eating-ware.

Some of the heretofore disclosed and utilized weight loss or diet device's components remain the same size throughout the diet process, while others require measurement and transfer of a food portion. None take into account the impact on the user of seeing a smaller portion served on typically sized eating-ware. As the portions get smaller the user will feel more and more deprived and therefore, more and more discouraged from continuing on his/her weight management program.

Children consume a significant portion of their food outside of the home. None of the heretofore disclosed devices or diet methods provide a system that a young child can implement independent of the parent, for example at school. None of the heretofore disclosed devices or diet methods consider the system that a child can use to prevent being overweight as soon as the child knows letters and numbers.

Notwithstanding the efforts of prior art workers to construct an efficient dieting device and methods for modifying eating habits, there remains a need in the art for an incrementally-sized standard-sized eating-ware system and processes that provides gradual and unnoticeable food portion reduction, so that a user can modify his/her eating habits for effective weight management without feelings of deprivation. There remains a need in the art for an incrementally-sized standard-sized eating-ware system that provides a plurality of incrementally-sized standard-sized eating-ware components having successively decreasing standard size appointed to be utilized in a graduated manner over a period of time. Further, there remains a need for using a set of formulas that allow for standard sizing of the total volumetric capacity of eating-ware components, which includes the internal volume and the volume directly above the eating-ware component. There remains a need for numerical representation of the sizing that can be applied to eating-ware components and represent the total volumetric capacities of eating-ware components so that the user can follow with ease as he/she uses these incrementally-sized standard-sized eating-ware components to follow in an incremental fashion a regimen of weight management. Moreover, there remains a need in the art for a eating-ware system that provides a plurality of eating-ware components that incrementally adjust the structural dimensions to present a series of incrementally-sized standard-sized replicas of each component and therefore incrementally, gradually adjust the user habits and help the user become accustomed to consuming smaller portions over time and at a slower rate per mouthful.

There remains a need for a system of eating-ware component series that can be used by a consumer to adjust food portion size and the rate of food portion delivery with each mouthful in small increments without the feeling of deprivation. There remains a need for a system of formulas that will enable the user to eat from any type of eating-ware regardless of shape or type of eating-ware, and continue to maintain his/her weight management program. There remains a need in the art for an eating-ware system that not only controls the amount of food served as a portion but also controls the rate food is consumed with each mouthful. There remains a need for eating-ware that will enable the user to use typical eating-ware components as incrementally-sized standard-sized settings and/or as individual components and maintain weight through control of portion size and the rate of food consumption by selecting eating-ware of a standard size.

Additionally, there is a need in the art for an incrementally-sized standard-sized eating-ware set that utilizes a plurality of eating-ware components having successively decreasing standard size which become decreased by way of small increments to provide subtle changes in portion amounts served, so that a user does not feel deprived and can gradually and unnoticeably modify food portions consumed and establish healthy eating habits for effective weight management. There remains a need for a Caloric Density Mark System that will give a user a quick estimation of caloric food content.

SUMMARY OF THE INVENTION

The present invention relates to an incrementally-sized standard-sized eating-ware system and processes for weight management, comprising of a plurality of formulas to establish and assign standard sizes to eating-ware, where the standard sizes are based on a series of incrementally-sized flat surfaces, and the flat surfaces establish the basis for total volumetric capacity equivalents, and the total volumetric capacity equivalents comprise volume inside the eating-ware and directly above the eating-ware, and the standard sizes are used as a guide to control amount and rate of food consumed for weight management. The present invention provides incrementally-sized standard-sized eating-ware components, deployed during intervals to provide gradual and unnoticeable food portion reduction, enabling a user to modify his/her eating habits for effective weight management without feelings of deprivation. Eating-ware is comprised of any item that is used to eat from and/or eat with. The incrementally-sized standard-sized eating-ware system and processes provides a plurality of incrementally-sized standard-sized eating-ware components having successively decreasing standard sizes appointed to be utilized in a graduated manner over a period of time.

The incrementally-sized standard-sized eating-ware of the subject invention allows a user to serve and eat directly from a typical eating-ware component that has an established standard size, with no need for measurement or transfer. None of heretofore disclosed and utilized eating-ware devices and systems allow the user to use a flat surface and/or existing eating-ware unless they pre-measure food and/or transfer it from the device. Heretofore disclosed and utilized eating-ware devices and systems require the use of the device in order to maintain a weight program. This concept is non-transferrable to other devices whereas the incrementally-sized standard-sized eating-ware of the subject invention is applicable to all eating-ware.

None of the weight loss or diet devices heretofore disclosed and utilized address the standard portion size or standard snack size (SPS; SSS) for enabling the incremental adjustment of food amounts based on a numerical standard that represents total volumetric food capacity of an eating-ware component. Additionally, none of the above diet devices address the importance of standard size of the utensils and utensil-like eating-ware components using standard bite size (SBS) and/or standard nibble size (SNS) which affect the rate at which food is consumed. Consumers today can eat food directly out of the packaging, where none of these devices would assist the user in anyway unless they transfer and measure the food into another device and transfer back for consumption. The SPS, SSS, SBS, and/or SNS can be assigned to any prepackaged foods based on a total volumetric capacity equivalence to help guide the user to stick to his/her standard size and control his/her weight without having to transfer the food from the pre-packaged vessel. This is not possible with prior art devices. The prepackaged food does not carry indicia indicating standard sizes and/or Caloric Density Mark to help user make better food choices.

When the user knows the SPS, SSS, SBS, and/or SNS total volumetric capacity equivalent and the Caloric Density Mark, the user is able to quickly estimate the caloric content of his/her meal. No heretofore disclosed and utilized device presents this capability.

In addition food can be served on flat surfaces. Heretofore disclosed and utilized devices would require the user to transfer the food to the "measuring device" first and then place it on the flat serving surface. A flat surface or an area emphasized on a flat surface can have an assigned SPS, SSS, SBS, and/or SNS to help guide the user and maintain his/her weight management process. None of prior art has this capability.

The incrementally-sized standard-sized eating-ware system and processes provide a set of formulas that allow for standard sizing of the total volumetric food delivery capacity of eating-ware components, where the total volumetric food delivery capacity includes both the internal volume and the volume directly above the eating-ware component. The incrementally-sized standard-sized eating-ware system and processes further provide numerical representation of the sizing that can be applied to eating-ware components and represent the total volumetric capacities of eating-ware components so that the user can follow with ease as he/she uses these incrementally-sized standard-sized eating-ware components to follow in an incremental fashion a regimen of weight management. The incrementally-sized standard-sized eating-ware system and processes can be used by a consumer to adjust food portion size and the rate of food portion delivery with each mouthful in small increments without the feeling of deprivation. Moreover, the incrementally-sized standard-sized eating-ware system and processes enables the user to eat from any type of eating-ware regardless of shape or type of eating-ware, and continue to maintain his/her weight management program.

The amount of food served as a portion is controlled by use of the incrementally-sized standard-sized eating-ware system and processes, while also providing control for the rate of food consumed with each mouthful. The incrementally-sized standard-sized eating-ware system and processes provide eating-ware that will enable the user to use typical eating-ware components as part of an incrementally-sized standard-sized setting and/or as a single component, and maintain weight through control of portion size and the rate of food consumption by selecting a eating-ware of a standard size. Use of typical eating-ware components that are sized using the formulas for standard sizes for portion, snack, bite and nibble size of the incrementally-sized standard-sized eating-ware system and processes, can be identified with numerically based indicia for ease of identification of the standard size, and these components are available in a series of incrementally-sized replicas, so the user can transition from one to the next in the series without feeling the effect of change. A user is able to maintain his/her program for weight management regardless of type of food consumed and/or the type of eating-ware component used to help the user adjust and/or maintain the amounts of food consumed and/or the rate of consumption and maintain a healthy weight.

The incrementally-sized standard-sized eating-ware system utilizes a set of formulas to establish and/or identify standard sizes for the total volumetric food delivery capacity of eating-ware components, where the total volumetric food delivery capacity includes both the volume inside and a volume directly above the eating-ware component. This food delivery capacity determines the total food served for eating-ware components from which the food is eaten and the rate of food transfer/consumption for eating-ware components with which the food is eaten.

The amount of food/substance a user consumes is a function of his/her visual assessment of food/substance amount relative to the serving container. The serving surface area, especially the planar view, is an important aspect of this assessment. FIG. 8 shows how visually the portion appears smaller on a larger diameter surface. The formulas are based on incrementally decreasing surface areas, which optimizes the users visual planar perception of adequate portion size and the rate of consumption, and as a result minimizes the emotional impact on the user as the user adjusts the standard size of his/her eating-ware components.

The formulas establish four types of standard sizes: Standard Portion Size (SPS) and Standard Snack Size (SSS), which are used for determination of total volumetric food delivery capacity; and Standard Bite Size (SBS) and Standard Nibble Size (SNS), which are used for rate of total volumetric food delivery capacity per mouthful. The formulas for standard size can be applied to any eating-ware, regardless of internal and/or external configuration, and establish relationships between different styles and types of eating-ware, enabling the user to continue the weight management efforts regardless of the eating-ware used.

When utilizing the incrementally-sized standard-sized eating-ware system and processes a user selects a starting standard size based on a combination of weight management factors, and over time successively shifts to eating-ware components having smaller/larger standard size. The incrementally-sized standard-sized eating-ware system and processes utilize a plurality of eating-ware components having successively decreasing standard size that decrease by way of small increments to provide subtle changes in portion amounts served and/or in the rate of food consumption, so that a user does not feel deprived and can gradually and unnoticeably modify food portions consumed and establish healthy eating habits for effective weight management.

The incrementally-sized standard-sized eating-ware system comprises a plurality of incrementally-sized standard-sized eating-ware components forming a set. Each of the incrementally-sized standard-sized eating-ware components in the set has a standard size that is different from the successive or neighboring eating-ware component. Successively decreasing standard size provides different food volumes/portion sizes. As a result the total amount of food and the rate the food is transferred to the user subtly changes with each incremental adjustment.

The standard size successively decreases by an increment so that as a user shifts from each consecutive eating-ware component, the user gradually and unnoticeably decreases (or increases, depending on weight management needs) his/her portion and/or rate of food consumption over time.

Additionally, weight management processes/methods utilizing the incrementally-sized standard-sized eating-ware system are provided. The first step of the process involves a user selecting a starting eating-ware component, based on the user's weight goals. The starting eating-ware components are selected from a plurality of incrementally-sized standard-sized eating-ware components having successively decreasing standard size. Standard size of each of the incrementally-sized standard-sized eating-ware components are successively differentiated by an increment in order to modify the rate of food consumption and/or food portion intake delivered to a user. The user's selection of the starting eating-ware component can be determined, based on at least one weight management factor. Next, the user utilizes the starting eating-ware components for a designated time interval in order to deliver a starting food portion amount to the user and/or control the food delivery rate, during a meal. When a designated time interval is reached, the user adjusts his/her food portion amount by shifting to a successive eating-ware component selected from the incrementally-sized standard-sized eating-ware components that will deliver a differentiated food portion amount and/or the food delivery rate. Gradually, food portion amounts are adjusted as the user continuously shifts to each successive eating-ware component selected from the incrementally-sized standard-sized eating-ware components each time the designated time interval is reached. Portion amounts and/or rate of food consumption are gradually and unnoticeably modified until the user becomes accustomed to each rate and portion amount and reaches the weight goal. The rate the food amount is adjusted depends on the size increment of successive components selected from the incrementally-sized standard-sized eating-ware. Through continuous use and adjustment as needed of the standard sized eating-ware components, the user can maintain his/her ideal weight and continue to consume healthy food portions.

The incrementally-sized standard-sized eating-ware can also be used to help a user decrease the consumption of undesirable substances, for example alcohol, coffee, sodas, and/or specific foods that they need to limit due to their health specific considerations. The system can also be used to increase the consumption of more desirable substances like drinking water and/or eating more vegetables.

The system components can be used individually or in combination to help a user optimize her/his consumption and quickly adjust his/her total consumption and rate of consumption in response to life style changes to achieve and maintain healthy weight and or lifestyle. The incrementally-sized standard-sized eating-ware system enables the user to adjust the amounts they consume and/or the consumption rate with every meal, without having to measure, count and or record their consumption. As long as the user uses the incrementally-sized standard-sized eating-ware system, the user can continue her/his weight regimen process throughout his/her lifetime. For example, the user may decrease the standard size of his/her eating-ware components on days when he/she can't exercise, around holidays, days of lower activity level due to illness or other life stresses.

The incrementally-sized standard-sized eating-ware helps users gradually, virtually subliminally if needed, reduce the amount of food they consume with each meal and change how fast they consume their portion amount served. The numerical system makes it easy for users to maintain their consumption process regardless of the location the system is implemented. The flexibility of the system enables a user to create unlimited combinations to manage their own consumption process their own way.

The caloric density of food can be calculated and a Caloric Density Mark can be established for any food.

Prepackaged food can have indicia indicating standard sizes as well as Caloric Density Mark to help user make better food choices. Any food served can also be identified with the Caloric Density Mark indicated on books, guides, software, charts, menus, signs, and/or labels.

Combining the total volumetric capacity with the concept of caloric food densities will help the user mange their consumption. Users that have modified diets to limit certain types of foods, for example, diabetics may use the incrementally sized standard-sized eating-ware components for individual type of food or number of standard bites or nibbles per meal per day.

The program can incorporate charts and/or software for selection and/or determination of factors that determine the transition rate of each consecutive standard size. Software can be provided to give a person a single number that will represent their total consumption for the day.

Because the standard sizes are based on total volumetric capacity, the sizes can be assigned to any eating-ware components regardless of what measurement system they were produced under. This is an additional advantage to the incrementally-sized standard-sized eating-ware system which creates a single global standard for all eating-ware components.

For illustrative purposes, the invention has been described in the specification and drawings with reference to round and elliptical eating-ware components. It will be understood by those skilled in the art that the incrementally-sized standard-sized eating-ware can have a wide variety of shapes which are other than round or elliptical. Substantially any eating-ware shape that permits incremental changes to be made in the surface area and/or total volumetric food delivery capacity of the incrementally-sized standard-sized eating-ware is intended to fall within the scope of the invention.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 1b illustrates a schematic view of some of the incrementally-sized standard-sized eating-ware components separated from the set/stack of FIG. 1a;

DEFINITIONS

Figure 1A:
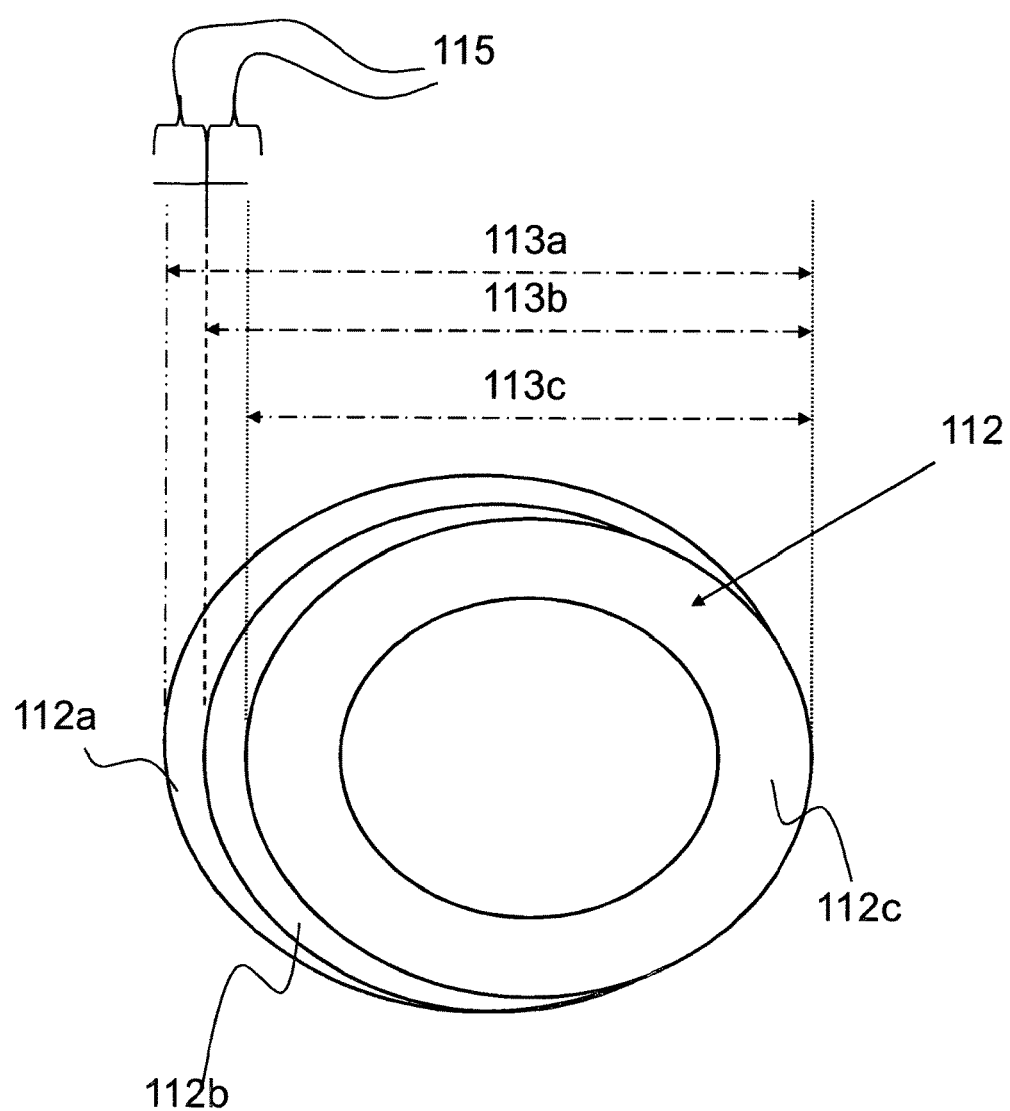
FIG. 1a illustrates a schematic view of a stack of eating-ware components of the incrementally-sized standard-sized eating-ware system, which when flat represent Standard Size surfaces of SPS and SSS.

The term "Caloric Density Mark" refers to a letter representation of the caloric density of food in terms of calories per cubic inch' wherein the Table A below lists the letters and the amount of calories per cubic inch they represent.

TABLE A

| Caloric Density Mark | |
|---|---|
| Letter designation | Calories per cubic inch |
| A | 0-10 |
| B | >10-20 |
| C | >20-30 |
| D | >30-40 |
| E | >40-50 |
| F | >50-60 |
| G | >60-70 |
| H | >70-80 |
| I | >80-90 |
| J | >90-100 |
| K | >100-110 |
| L | >110-120 |
| M | >120-130 |
| N | >130-140 |
| O | >140-150 |
| P | >150-160 |
| Q | >160-170 |
| R | >170-180 |
| S | >180-190 |
| T | >190-200 |
| U | >200-210 |
| V | >210-220 |
| W | >220-230 |
| X | >230-240 |
| Y | >240-250 |
| Z + number | for amounts over 250 |

The term "delta", as used herein, means an incremental difference.

The term "eating-ware", as used herein, means any object/surface from which food is directly consumed or with which food is transferred directly into the user's mouth, including but not limited to: disposable and non-disposable eating-ware; eating-ware having a round, oval, square, cylindrical, cubic, irregular, polygonal, or a variety of shape configurations; objects one eats from such as tableware, dish-ware, drink-ware, beverage containers, snack-ware, designated eating surface, standard portion template (thin, food-safe material), food packaging, plates, bowls, cups, mugs, glasses, food trays, sushi boards, paper plates, juice boxes and juice bags, frozen food trays, plastic bags, bottles, fast food containers, bags, etc.; eating-ware used to transfer food directly to the user's mouth such as flatware, silverware, utensils, cutlery, straws, chopsticks, wooden sticks, etc.;

packaged-ware or pre-measured-ware that contains prepackaged foods that consumer eats directly from the package.

The term "eating-ware accessories", as used herein, means items/objects that are used alongside eating-ware as part of a table-ware setting, for example: place mats, napkins, etc.

The term "food delivery capacity", as used herein, means the total volumetric capacity of an eating-ware component to deliver volume of food within the boundaries of its rim and directly above its rim. The volume of food contained inside —liquid equivalent plus the ability of the item to hold food directly above the rim when solid food is being served. The volumetric food standard portion sizes: SPS,SSS,SBS,SNS; take into account the total volumetric food delivery capacity of an eating-ware component.

The term "food", as used herein, means any consumable substance, nutritious and non-nutritious, such as meals, snacks, beverages, alcohol, etc., that may be consumed by an individual.

The term "Food Consumption Rate (Rate of Food Consumption)", as used herein, means the amount of food transferred directly to the user per Standard Bite and/or Standard Nibble.

The term "Incrementally-Sized Standard-Sized Eating-ware System", as used herein, generally means a system for management of daily consumption of food for preventing excess weight gain and for weight adjustment and/or maintenance including:
  using formulas in a device, process or system for calculating standard sizes, and
  using formulas/calculations in a device, process system that define the relationship between various standard-sized eating-ware components and the standard sizes for the purpose of cross-referencing and to use exchangeably (interchangeably), and
  incrementally-sized standard-sized eating-ware components, and
  indicia or other means of indicating a numerical standard size, and
  processes for using the incrementally-sized standard-sized eating-ware for weight management, and
  a series of multi-type incrementally-sized standard-sized eating-ware settings The term "Incrementally-sized standard-sized eating-ware settings", as used herein, means a series of multi-type incrementally-sized standard-sized eating-ware settings where components within each setting maintain relative proportion to other components within the setting, to minimize the perception of the incremental changes. Each setting in the series makes up a series of congruent sets.

The term "prepackaged food", as used herein, means foods (such as candy, cookies, crackers, frozen dinners, etc,) that are served in commercial packaging and may be consumed directly out of packaging (such as bags, boxes, flat sushi boards, trays, fun shaped containers, etc.)

The terms "pre-served food" or "pre-measured food", as used herein, mean prepared food that is already portioned out and may be served at a buffet, cafeteria or other eateries.

The term "process", as used herein, means a systematic series of adjustments in incrementally-sized standard-sized eating-ware components standard sizes in a variety of combinations to adjust and/or maintain food consumption and consequently weight.

The term "setting", as used herein, means multiple types of eating-ware components used together at the same time. Similar to a "place setting" or "table setting". For example a setting may include any or all: dinner plate, salad plate, soup bowl, dessert plate, bread plate, spoons, forks, knives, other utensils, glass, cup, mug, wine glass, etc.

The term "Standard Bite Size (SBS)", as used herein, means a numerical representation of a volume of food that can be contained in an ellipsoid that is formed around a flat elliptical (spoon-like) shape defined by the formula for SBS (See FORMULAS section).

The term "Standard Eating-ware", as used herein, means an eating-ware component that has an established and/or known SPS, SSS, SBS, and/or SNS.

The term "Standard Nibble Size" (SNS), as used herein, means a numerical representation of a volume of food that can be contained in an ellipsoid that is formed around a flat elliptical (spoon-like) shape defined by the formula for SNS (See FORMULAS section).

The term "Standard Eating-ware", as used herein, means an eating-ware component that has an established and/or known SPS, SSS, SBS, and/or SNS The term "Standard Portion Size" (SPS), as used herein, means a numerical representation of a volume of a 1 inch high cylinder formed above a flat round surface defined by the formula for SPS (See FORMULAS section).

The term "Standard Size", as used herein, means Standard Portion Size, and/or Standard Snack Size, and/or Standard Bite Size, and/or Standard Nibble Size.

The term "Standard Snack Size" (SSS), as used herein, means a numerical representation of a volume of a 1 inch high cylinder formed above a flat round surface defined by the formula for SSS (See FORMULAS section).

The term "style" of Standard-sized Eating-ware Component as used herein, refers to different appearances or configurations of a given type of eating-ware, for example: rimless plate vs. rimmed plate, round plate vs. square plate, tall thin glass vs short fat glass, deep bowl vs. shallow bowl, round spoon vs. oval spoon etc.

The term "Total Volumetric Capacity", as used herein, means a Total Volumetric Food Delivery Capacity of an eating-ware component which is the sum of the volume inside the eating-ware component and the volume of a designated space directly above eating-ware component.

The term "type" of Standard-sized Eating-ware Component, as used herein, means for example: plate, cup, spoon, knife, bag, designated surface, pre-packaged food container, etc.

DETAILED DESCRIPTION OF THE INVENTION

The incrementally-sized standard-sized eating-ware system and processes of the present invention comprise using a plurality of formulas to establish and assign standard sizes to eating-ware, where the standard sizes are based on a series of incrementally-sized flat surfaces, and the flat surfaces establish the basis for total volumetric capacity equivalents, and the total volumetric capacity equivalents comprise volume inside the eating-ware and directly above the eating-ware, and the standard sizes are used as a guide to control amount and rate of food consumed for weight management. The present invention provides incrementally-sized standard-sized eating-ware components, deployed during intervals to provide gradual and unnoticeably food portion reduction, enabling a user to modify his/her eating habits for effective weight management without feelings of deprivation. Eating-ware is comprised of any item that is used to eat from and/or eat with. The incrementally-sized standard-sized eating-ware system and processes provide a plurality of incrementally-sized standard-sized eating-ware components having successively increasing or decreasing standard sizes appointed to be utilized in a graduated manner over a period of time. The incrementally-sized standard-sized eating-ware system and processes of the present invention are designed to decrease or increase serving sizes and visa vie consumption of food over a period of time, depending on a user's weight management needs.

When selecting eating-ware there are limited choices of relative sizes within a typical eating-ware set, for example: dinner plate, salad plate, desert plate, bowl, and cup. Depending on a manufacturer and/or style, all these items come in a variety of different sizes and configurations. In addition to china-like eating-ware, a consumer typically adds mugs, glassware, utensils and cutlery and eating-ware accessories that complete user's typical serving setting. Even though visually these eating-ware components of same type may appear similar, they will deliver very different food quantities. Depending on the style or manufacturer of the eating-ware, the internal volume of the eating-ware component and the amount of food that can be served directly above the upper boundary of component will vary. The user does not have a way of verifying how much total volumetric capacity an eating-ware component has and/or how the different components' total volumetric capacities relate to each other. For example: a flat plate, to a deep plate, to a bowl, to a cup, to a spoon, to a fork, etc. Advantageously, the subject incrementally-sized standard-sized eating-ware system and processes readily discerns the total (internal and directly above) volumetric capacity of the eating-ware components and assigns it a numerical equivalency across components.

Use of the subject incrementally-sized standard-sized eating-ware system and processes facilitate attainment of a healthy weight for a user. Various factors affect consumer's weight. These factors include not only what food is consumed, but how much food is consumed, which in turn is directly relevant to the portion served. As eating-ware has increased in size, normal food portions served on that eating-ware appear smaller and smaller. In response, users have increased the amount served to compensate for this illusion. The incrementally-sized standard-sized eating-ware system and processes takes advantage of this phenomenon. As the user moves to smaller and smaller standard size eating-ware components, the food portions appear larger, thus encouraging the user to consume less.

The incrementally-sized standard-sized eating-ware system and processes uniquely address the amount a consumer eats by very slightly changing one's portion size, via relative sizes of all the components of a setting that the user is using. Users have difficulty reducing the size of their portion when the eating-ware remains the same size. Even if he/she adjusts the size of some of the eating-ware, the food portion will appear smaller due to the relative size appearance of other eating-ware components. Thus, the incrementally-sized standard-sized eating-ware system and processes result in virtually unnoticeable decrease of portion size to facilitate weight control.

The ability of an individual to maintain healthy weight is affected by the amount of food they serve themselves and the rate they consume the food. In addition to the size of portion consumed, the rate of consumption impacts the consumer's feeling of satiation. The slower the food is consumed by the user the more satisfied he/she will feel with lesser amount of food. One way to control that is to eat more slowly, and another is to eat less with each mouthful. Smaller standard bite/nibble size will deliver food directly to the user at a slower rate. The user will be able to have more bites/nibbles per specific standard portion size or standard snack size. This will automatically slow down the rate of consumption. The slower the person eats, the more satiated they will feel and consequently consume less food.

Gradual portion control presented in a discrete manner further facilitates successful dieting and healthy eating habits. With gradual portion control, those dieting (or intending to gain weight, when specific health needs so require) are not constantly reminded of their portion reduction or increase as they are eating; this tends to relieve mental and emotional pressures that often sabotage dieting efforts. Moreover, a discrete gradual portion control device and processes can be utilized when dining with guests, without making the user's diet glaringly obvious.

Another important factor uniquely considered by the incrementally-sized standard-sized eating-ware system and processes of the subject invention concerns the actual transfer of food into the person's mouth. Currently, there are no standards or recommendations with regard to the eating-ware that is used to transfer the food into a person's mouth. This disregards an important factor that affects the individual's consumption process. The larger the utensil-like eating-ware, the larger the amount of food that will be delivered per mouthful. The larger the amount of food that is delivered per mouthful, the faster the user consumes his/her portion. The lack of feeling of satiation is an important aspect of why people overeat. When they consume food fast, they do not experience the feeling of satiation and as a result eat more than they need. Reducing the rate of food transfer to the user by using incrementally smaller utensils results in a decrease in portion amount eaten as more bites are needed, causing a psychological effect of feeling full sooner and thus resulting in consuming of a smaller portion of food overall during a meal. The Incrementally-Sized Standard-Sized Eating-ware System surprisingly and unexpectedly addresses the need for controlling the entire consumption system, not only the amount of food served and/or consumed but also the rate that the user consumes the food by defining the Standard Sizes for all eating-ware.

The user can use the Incrementally-Sized Standard-Sized Eating-ware System to optimize their standard bite size to determine optimal size of the standard "bite/nibble" to maximize feeling of satiated and optimize the number of standard bites/nibbles per day to their weight management goals. User can also use the Incrementally-Sized Standard-Sized Eating-ware System to optimize his/her standard food portion size to determine the optimal food delivery level for healthy weight maintenance.

The Incrementally-Sized Standard-Sized Eating-ware System includes a Standard Portion Size, Standard Snack Size, Standard Bite Size, and Standard Nibble Size each established by using a formula. The detailed explanation of these formulas used in the process and system are included in the FORMULAS section below. The formula for Standard Portion Size is based on a series of total volumetric capacity equivalents (expressed in cubic inches) defined by volumes of 1 inch high cylinders above flat round surfaces that start at a 4 inch diameter and vary in size in small diameter increments of the cylinder bases. The formula for Standard Snack Size, is based on a series of the total volumetric capacity equivalents (expressed in cubic inches) defined by volumes of 1 inch high cylinders above flat round surfaces that start at a 0 inch diameter and vary in size in small diameter increments of the cylinder bases. The formula for Standard Bite Size is based on a series of total volumetric capacity equivalents (expressed in cubic inches) defined by volumes of ellipsoids surrounding flat elliptical surfaces that vary in size in small increments in the major and minor radii, where the major radius starts at 0.5 inch and minor radius starts at 0.25 inch, where both minor radii are equal, and the major radius equals the minor radius times 1.5 plus 0.125. The formula for Standard Nibble Size is based on a series of total volumetric capacity equivalents (expressed in cubic inches) defined by volumes of ellipsoids surrounding flat elliptical surfaces that vary in size in small increments in the major and minor radii, where each of the major and minor radii start at 0 inch, both minor radii are equal, and the major radius is equal to the minor radius times 1.5. These formulas are used to establish the numerical value of a standard size and are calculated by the following formulas:

a) Standard Portion Size (SPS)=(the diameter of a cylinder in inches−4)*4, b) Standard Snack Size (SSS)=the diameter of a cylinder in inches*8, c) Standard Bite Size (SBS)=40*minor radius of ellipse in inches−10, and d) Standard Nibble Size (SNS)=80*minor radius of ellipse in inches.

Note that Standard Portion Size numerical values will be negative numbers for surface diameters less than 4 inches and can be used as such, but a Standard Snack Size may be preferable for these sizes. Similarly, Standard Bite Size will be negative for minor radii smaller than 0.25 inches and can be used as such, but a Standard Nibble Size may be preferable for these sizes.

These Incrementally-Sized Standard-Sized Eating-ware System Standard Sizes help the user control the amount of food served and/or consumed and also the rate at which the user consumes the food.

The Incrementally-Sized Standard-Sized Eating-ware System eating-ware components are sized and/or identified with Standard Sizes, where standard Portion Size and Standard Snack Size are used to control the total volumetric capacity of eating-ware which in turn controls the amount of food per serving, and wherein standard Bite Size and Standard Nibble Size are used to control the total volumetric capacity of eating-ware which in turn controls the rate of food consumption per bite-full/mouthful.

These formulas are used to determine a standard size for all eating-ware components. They uniquely provide a system that can be used by manufacturers to indicate the standard sizes of eating-ware components for the users, so that the users will be able to continue to stay on their weight management regimen no matter what they eat (type of food and/or type of meal), what eating-ware component they eat from (plate, bowl, cup, glass, flat surface, bag, pre-packaged-ware, etc.), eat with (fork, knife, spoon, straw, chop sticks, etc.), or where they eat (restaurant, cafeteria, friend's home), as long as the users verify the standard size of the eating-ware components that they are using. The standard sizes can also be assigned directly to a food amount that is served independent of its container, for example, a sign at a buffet can indicate the slice of pizza or a slice of lasagna is standard size of 3.0 and a Caloric Density Mark of D.

The incrementally-sized standard-sized eating-ware system and process result in a decrease of portion size which facilitates weight control. This is achieved through use of the incrementally-sized standard-sized eating-ware system's unique eating-ware components that look like and/or are typical eating-ware so that the user has the flexibility to eat any type of food and continue to stick to the weight management program. The Incrementally-Sized Standard-Sized Eating-ware System formulas can be used to design any eating-ware component to a specific Standard Size. The design process comprises of the following steps:

a) determining the features of eating-ware component;

b) determining the internal and/or external features and/or configuration that will result in total volumetric capacity equivalent to the desired Standard Size total volumetric capacity;

c) assigning corresponding Standard Size and/or Standard Size Range to the eating-ware.

The Incrementally-Sized Standard-Sized Eating-ware System eating-ware components can form series of multi-type components so that the user can shift from one component to another within the series to adjust the amount and rate of consumption.

The Incrementally-Sized Standard-Sized Eating-ware System formulas can also be used to design any eating-ware series that adjusts in Standard Size increments small enough to be indistinguishable by the user, by following these steps:

a) determining the internal and/or external features of eating-ware;

b) determining the smallest or largest size in the series;

c) determining the largest Standard Size increment visually undetectable by the user in the series;

d) determining the number of eating-ware components in the series;

e) adjusting the internal and/or external features for each increment in size to achieve a total volumetric capacity equivalent for each component within the series, while maintaining undetectability;

f) assigning the Standard Size and/or Standard Size Range to the eating-ware that corresponds to the Standard Size equivalent total volumetric capacity of each component in the series.

These Incrementally-Sized Standard-Sized Eating-ware System series can be made as a series of single type and/or style of eating-ware, or form a series of multi-type incrementally-sized Standard-Sized eating-ware settings where components within each setting maintain relative proportion (congruent dimensions) to other components within the setting, to minimize the perception of the incremental changes, and where:

a) components within each setting have the same corresponding Standard Size, or b) components within the setting have a different Standard Size, and all eating-ware components in a consecutive setting are increased or decreased in Standard Size by one or more increments with each adjustment to modify food amounts.

The Incrementally-Sized Standard-Sized Eating-ware System eating-ware series components internal and/or external dimensions and/or configurations (including depth, height, slope of the walls, wall thickness, internal texture, shape of the inside, shape of the bottom, and/or a combination of some or all of the above) can be varied so that the amount of food delivered and/or the rate of delivery varies in small increments, while maintaining the visual appearance of sameness.

The Incrementally-Sized Standard-Sized Eating-ware System formulas can be used to determine and assign any Standard Size and/or Standard Size Range to any existing eating-ware by:

a) selecting which of Standard Size (Standard Portion Size, Standard Snack Size, Standard Bite Size or Standard Nibble Size) and/or Standard Size Ranges of eating-ware is to be assigned, b) determining the internal volume of the eating-ware,
c) determining the cross-sectional area of the top of the eating-ware,
d) determining the equivalent total volumetric capacity of the Standard Size that has the same cross-sectional surface area as the cross-sectional area of the top of the eating-ware,
e) calculating total volumetric capacity of the eating-ware by adding volume (b) and (d) for Standard Portion Size or Standard Snack Size, or adding volume (b) and one-half of (d) for Standard Bite Size or Standard Nibble Size,
f) determining the numerical Standard Size that corresponds to the total volumetric capacity, and
g) assigning the corresponding selected numerical Standard Size and/or Standard Size Range to the eating-ware.

The incrementally-sized standard-sized eating-ware system formulas can be applied to determine standard sizes of existing eating-ware components. With the incrementally-sized standard-sized eating-ware component system any eating-ware item for eating food from and/or eating food with can be used as long as the formulas are applied to determine the standard size and/or sizes of the eating-ware component. These formulas can be applied to a volumetric quantity of food directly. The Incrementally-Sized Standard-Sized Eating-ware System formulas can be used for assigning a Standard Size and/or Standard Size Range to a volume of food that equates to the total volumetric capacity equivalent to the specific Standard Size and/or a Standard Size Range.

Pre-packaged food can be eaten directly out of the packaging. The incrementally-sized standard-sized eating-ware system will enable the user to continue his/her weight management regimen when eating directly out of pre-packaged containers. The Incrementally-Sized Standard-Sized Eating-ware System formulas can be used to determine and assign and/or indicate a Standard Size and/or Standard Size Range on the pre-packaged and/or pre-measured amount of food to reflect the volumetric amount of food contained therewithin that equates to the specific Standard Size and/or a Standard Size Range.

There are some instances where eating-ware does not permit food to be served above a rim of the eating-ware component. In this situation the Incrementally-Sized Standard-Sized Eating-ware System formulas will be used to assign a Standard Size and/or Standard Size Range based on the internal volume only. The internal volume of the eating-ware is equated to the total volumetric capacity equivalent to the specific Standard Size and/or a Standard Size Range and that Size or Range is assigned to the eating-ware.

Through use of the incrementally-sized standard-sized eating-ware system and processes fluid consumption can also be added to the total consumption of the caloric intake especially alcohol, sodas, and fruit drinks. The Incrementally-Sized Standard-Sized Eating-ware System can be used for purposes other than weight management. The Incrementally-Sized Standard-Sized Eating-ware System can comprise of a series of Standard Sized eating-ware that is used for subtle and incremental management of consumption of other edible substances including alcohol, coffee, water, sodas, fruit drinks, etc. and specific food types, for example decreasing high sugar content or high fat content, or increasing high vitamin or other nutrient content. So for example if you'd want a child to increase the amount of vegetables they consume you would place those on a large Standard Size eating-ware component and the amount would appear small. So gradually and unnoticeably increasing the size of "vegetable" eating-ware would motivate the child to eat more vegetables.

The incrementally-sized standard-sized eating-ware system and processes helps to control the gradual decrease in these high calorie consumables through numerically guided incrementally adjustable system.

Uniquely, a SPS, SSS, SBS, and/or SNS can be assigned to any pre-served food or prepackaged foods based on a total volumetric equivalence to help guide the user to stick to his/her standard size and control his/her weight without having to transfer the food from the pre-packaged vessel, while previously proposed weight loss services require a user to transfer the food to the "measuring device" first and then transfer it again on to the eating surface.

In addition to the SPS, SSS, SBS and/or SNS the pre-packaged ware can have the Caloric Density Mark, which refers to a letter representation of the caloric density of food in terms of calories per cubic inch, which will help the user in selecting foods. (See Table A) This will give the user a quick way to make a determination of the total calories contained. For example, user sees 2 candy bars next to each other, both are SBS=10 one is marked A and the second with E. It would indicate to the user that the "A" candy bar has significantly fewer calories than the "E" candy bar. This would be very useful to children since they can learn to look for foods that have lower caloric densities by looking at the letter of the alphabet when making choices. The Incrementally-Sized Standard-Sized Eating-ware System includes a system for assigning a Caloric Density Mark to caloric food density ranges where each letter of the alphabet represents a caloric density range starting with A representing 0 up to and including 10 calories per cubic inch, B representing more than 10 up to and including 20 calories per cubic inch, and so on up to Y representing more than 240 up to and including 250 calories per cubic inch, with higher caloric densities represented by Z plus the number of calories per cubic inch.

The Incrementally-Sized Standard-Sized Eating-ware System Caloric Density Mark can be listed in or indicated on books, guides, software, charts, menus, signs, labels, or external packaging indicia.

The incrementally-sized standard-sized eating-ware system and process is already a pre-measured surface area and provides a pre-measured eating-ware. A flat surface or an area emphasized on a flat surface of the incrementally-sized standard-sized eating-ware system can have an assigned SPS, SSS, SBS, and/or SNS to help guide the user and maintain his/her weight management process.

The incrementally-sized standard-sized eating-ware system adjusts the amount of food consumption and the rate the food is delivered to the user throughout the daily consumer's consumption process. The system consists of the eating-ware components that are periodically incrementally adjusted in size by the user, and have been standard-sized using the formulas for Standard Portion Size (SPS), Standard Snack Size (SSS), Standard Bite Size (SBS), and Standard Nibble Size (SNS). The formulas for SPS and SSS are used to assign standard sizes to eating-ware components from which food is eaten and define a total amount of food. The formulas for SBS and SNS assign sizes to eating-ware components that are used to transfer the food directly to the user and establish the rate of food transferred per mouthful.

The incrementally-sized standard-sized eating-ware system provides a simple representation of these standard-size total volumetric capacity representations of food amounts numerically.

The decimal number for a Standard Size is used to represent a single total volumetric capacity Standard Size, and a Standard Size Range is an integer that is used to represent a range of total volumetric capacities that include all decimal Standard Sizes having the same integer portion.

In other words, the integer value of a standard size represents a range of volumes that have the same number in the integer place. The decimal value of a standard size represents a single volume equivalent for each size SPS, SSS, SBS, and/or SNS. For example: Standard size 1 represents a range of volumes for sizes 1 and greater but less than 2. Standard size 1.13 refers to a unique total volumetric capacity equivalent for that particular standard size. This system makes it easy for the user to remember just a few numbers to maintain his/her weight management process.

The incrementally-sized standard-sized numerical eating-ware system also provides formulas for determination of the standard size for any eating-ware. This enables the user to continue with his/her weight regimen no matter where he/she eats and irrespective of type or style of eating-ware component the user utilizes. For example the user can use a plate, a bowl, a cup, a glass, a spoon or a fork, etc and continue to stick with his/her consumption process as long as the eating-ware has an established and/or identified standard size that the user is using in his/her weight management regimen.

The system affects the amount a user serves and the rate he/she consumes the substances served therefore it impacts the whole consumption process. With each incremental size adjustment the amounts change in small gradual steps so the user minimizes the feeling of deprivation and distress associated with typical portion reduction. The incrementally-sized standard-sized eating-ware system can be applied to most typical and non-typical eating-ware components. As a result the user has a process for modification of his/her consumption by the use of typical eating-ware components that have been sized and/or identified with the incrementally-sized standard-sized eating-ware system numbers for guidance in selection of eating-ware to help manage weight.

The user can select items from the Incrementally-Sized Standard-Sized Eating-ware System eating-ware components, where:
a) the Standard Sized eating-ware components form a series,
b) each successive component within the series varies by a Standard Size increment,
c) a change in increment is gradual and subtle so that the user is unmindful of that change when shifting between consecutive standard sizes within the series, and
d) a change in Standard Size increment results in adjustment of food amount served/consumed or the rate of consumption of food.

When the consumer has adjusted to the given serving size or food portion amount, the serving size is further decreased or increased, as the case may be, by utilizing the next incrementally-sized standard sized eating-ware component. The user selects the eating-ware component via the use of the standard size numbers SPS, SSS, SBS, and/or SNS. The unique standard number system cross-references all types of eating-ware components. The user can select different types of eating-ware as long as its standard size is maintained to stay within the weight management process.

Particularly, the incrementally-sized standard-sized eating-ware system provides incrementally-sized standard-sized eating-ware components appointed to be used in intervals to provide gradual and unnoticeable food portion reduction, so that a user can modify his/her eating habits for effective weight management without feelings of deprivation. A plurality of incrementally-sized standard-sized eating-ware components is provided. Each of these eating-ware components has a successively decreasing standard size so that each eating-ware component yields a different volume capacity for food, and hence presents a different portion amount.

A user typically consumes the food served on the eating-ware and transfers the food to his/her mouth using the available eating-ware. The user evaluates the amount of food to serve by visually observing the amount in the planar view from above the eating-ware. The accuracy of this evaluation is not adequate and as eating-ware has been increasing in size, so have the portions served, resulting in overeating. The incrementally-sized standard-sized eating-ware system has incorporated this important factor in the development of the formulas for the standard sizes. The basis of the formula is surface areas (round for the SPS and SSS like a flat plate, and elliptical for SBS and SNS like a flat spoon). The incremental adjustments are designed to help create a perception of sameness as the planar view of the eating-ware changes at such small increments that are virtually undetectable by the user. Most users will be able to adjust to the next size with a whole number adjustment, but some may need fractional adjustments.

The Incrementally-Sized Standard-Sized Eating-ware System comprises of a plurality of processes for using incrementally-sized Standard-Sized eating-ware with known Standard Sizes for weight management, where these processes change the amount of food consumed and/or the rate of consumption with each incremental adjustment in Standard Size and/or Sizes. In addition, they can be used to maintain weight by having the user continually using the same Standard Size.

The Incrementally-Sized Standard-Sized Eating-ware System includes a process to manage weight where a user determines the Standard Sizes of his/her current eating-ware components, and/or selects Standard Size components from within a series, and then:
a) continues to use those same Standard Sized eating-ware components to maintain weight,
b) periodically selects smaller Standard Sized components to reduce weight, or
c) periodically selects larger Standard Sized components to increase weight.

The Incrementally-Sized Standard-Sized Eating-ware System includes a process to manage weight where the user can use and/or adjust one or more of the Standard Sizes of eating-ware so that he/she:
a) uses same sizes for all food consumption,
b) uses different sizes for different types of meals,
c) uses different sizes for different types of food, or
d) implements any combination of the above scenarios, and controls the amount of food consumed and/or the rate that the food is consumed.

The Incrementally-Sized Standard-Sized Eating-ware System includes a process to manage weight where the user can incrementally adjust the total number of servings of one or more of a particular Standard Size consumed per time interval.

Another process to use the Incrementally-Sized Standard-Sized Eating-ware System to manage weight, allows the user to select a starting Standard Size of eating-ware, the size of incremental adjustment of Standard Size, and the time interval between periodic shifts to the next size in a self-directed process or with guidance from a professional and/or software.

The Incrementally-Sized Standard-Sized Eating-ware System includes a process to manage weight where the user selects Standard Sizes and/or makes adjustments based on various factors including age, health, medical conditions, height, weight, gender, activity level, life style or comfort level.

The Incrementally-Sized Standard-Sized Eating-ware System can be used with any existing eating-ware with assessed and/or assigned Standard Size and/or Standard Size Range for weight management, whether marked or unmarked.

Another unique aspect of the incrementally-sized standard-sized eating-ware system is the ability to give a volumetric representation for a flat surface. The flat round plate-like surfaces form the basis for the Standard Portion Size (SPS) and Standard Snack Size (SSS) system. Any flat surfaces have zero volumetric capacity for holding liquids, yet they can be used to serve solid substances and therefore impact the amount of portion served on them by the user.

Figure 8:
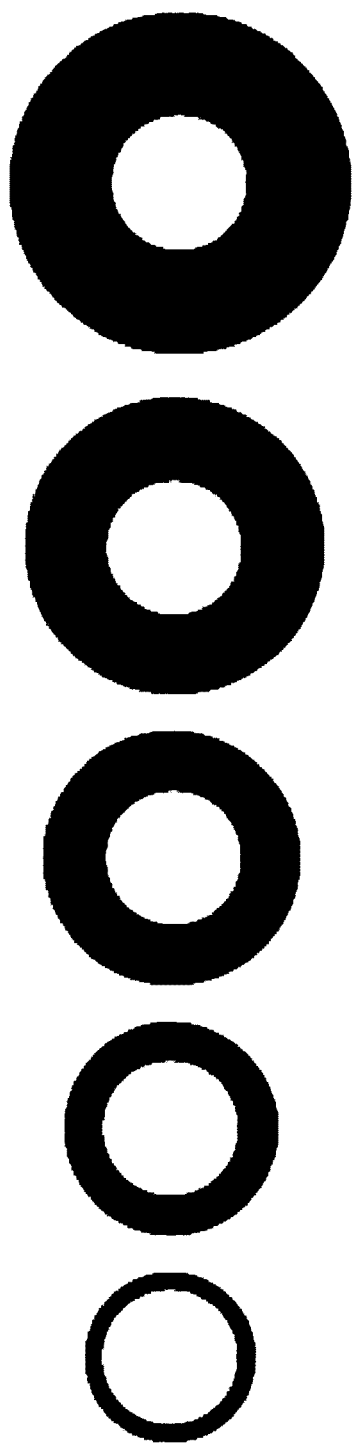
FIG. 8 illustrates a schematic planar view of the illusion created by a food portion placed on round flat surfaces that increase in diameter. This illusion leads to portion size distortion, whereby the portions appear smaller and smaller as the round flat surface increases even though the portion size remains constant.

A same size portion served on a small surface that just contains it vs. being served on a large surface that reveals a lot of surface area around it will appear to the user as a larger portion (See FIG. 8). The empty space creates an illusion where the portion appears smaller when presented on the larger surface with lots of empty space around it. Adjusting the eating-ware components size will result in the user serving smaller quantities of food without the feeling of deprivation and therefore help the user lose and maintain weight.

Just like flat round plate-like surfaces are the basis for SPS and SSS, flat elliptical spoon-like surfaces are the basis for Standard Bite Size (SBS) and Standard Nibble Size (SNS) which affect the incrementally-sized standard-sized eating-ware components that are used by the user to transfer the substances directly to the user. As the numeric standard-size of utensil-like eating-ware components adjusts, it changes the amount of food the user consumes per each mouthful. Even though the total amount of food consumed may have incrementally decreased with an adjustment of SPS/SSS, by simultaneously adjusting the SBS/SNS the user will experience more mouthfuls and slow down his/her rate of consumption and therefore further minimize the feeling of deprivation.

The eating-ware components are appointed to be utilized in a graduated manner over a period of time. Small, incremental changes in standard sizes are successively provided, so that the food portion changes from eating-ware component to eating-ware component are subtle. Advantageously, with this arrangement, the user does not feel deprived and gradually establishes healthy eating habits for effective weight management.

Long-term use of smaller incrementally-sized standard-sized eating-ware components prevents weight gain after the user's diet is complete, allowing the user to readily maintain his or her weight. This is especially useful, as dieters who are successful at losing the weight frequently gain it back after a period of time.

Long-term use of incrementally-sized standard-sized eating-ware will assist the users in adjusting their weight through their daily consumption and maintain it by continually using the standard size of their eating-ware after they achieve their healthy weight. Incrementally-sized standard-sized eating-ware can be used for all meals throughout a person's life span and adjusted by the user due to life style changes or aging. The user can quickly adjust their consumption in response to their lifestyle changes like aging or illness, and/or changes in activity level, simply by changing the standard size used.

The incrementally-standard-sized eating-ware can be used for children to help them develop a healthy lifestyle. A child will not be able to comprehend the complex calorie based systems for weight management. Adults have difficulty in making the decision of how much food to serve themselves and when they feel full. That is a task beyond most children's ability. Yet a first grader will be able to know his/her eating-ware size and fill it up. A parent will be able to increase the eating-ware size as the child grows to maintain a healthy weight much easier with the incrementally-standard-sized eating-ware.

Long-term use of the eating-ware components reduces the need to track data, count calories, and calculate portion sizes, etc., throughout and after the diet. The act of counting calories and measuring food adds to the feeling of deprivation and constant awareness of being on a restrictive diet.

Advantageously, once a user knows their eating-ware component standard size weight maintenance is readily achieved.

The user only needs to remember a few numbers to help guide him/her in daily choices of eating-ware. The user will no longer have to measure or weigh substances prior to consumption. As restaurants, cafeterias, eating-ware manufacturers, food manufacturers, etc. incorporate the incrementally-sized standard-sized eating-ware system the users will be able to maintain their weight management system anywhere they choose as long as the standard sizes SPS, SSS, SBS and/or SNS of the food amount or the eating-ware component are readily available to the user.

The Incrementally-Sized Standard-Sized Eating-ware System Standard Sizes formulas use inches as the basis for the origin of these sizes. These formulas can be expressed in units other than inches, inches squared, and/or inches cubed through unit conversions of corresponding measures of other Measurement Systems.

Incrementally-sized standard-sized eating-ware components are provided, as well as optional place settings and utensils, to induce behavior modification, causing desired weight loss (or gain) and establishing new, healthy eating habits.

The incrementally-sized standard-sized eating-ware can be grouped as a place setting made up of all the components that the user will use to consume directly from and/or transfer the substance directly into their body, such as: dinner plate, salad plate, desert plate, spoon, fork, knife, tea-spoon, glass, cup, mug, glassware and many other items that typically make-up a setting. The user can change the standard size of all items at once, or one or more items at the time, creating unlimited combinations available to the user. This will truly allow the user to adjust his/her consumption process as slowly or as quickly as the user chooses.

Changes in eating-ware component standard size occur in small increments, making it difficult to notice the changes from day to day, or week to week. Small daily or weekly changes in increments utilized by the incrementally-sized standard-sized eating-ware system and processes minimize dieting discomfort.

The user can make the standard size increment adjustments so small that they are virtually undetectable by the user. This is especially helpful for parents who are trying to instill healthy habits for their children. The incrementally-sized standard-sized eating-ware system currently provides the only method that can easily help a parent manage their child's weight. Others have tried to come up with a method that can be applied across all children, yet these methods come up short due to the high variability in growth and stature from child to child. The incrementally-sized standard-sized eating-ware makes these small adjustments possible without the chore of measuring and calculating portions.

The eating-ware components are proportioned between each standard size so that the calorie intake is slowly reduced (or increased) and a person is dieting (or gaining weight) without significant effort and/or the recognition that a change in caloric intake is occurring.

The human body does not possess a mechanism to evaluate the number of calories the person consumed. A person can consume a chocolate bar that is 600 calories and may still be hungry. With the abundance of varieties of foods that are available today a person has no mechanism that will indicate that what they consumed is sufficient. Because of that they depend largely on their visual interpretation and memory of what they've consumed. Consumers using the eating-ware components of the incrementally-sized standard-sized eating-ware system and processes will gradually become accustomed to smaller (or larger) standard sized eating-ware components and glassware, and portions of food and drink. Counting calories, measuring food portions, and dietary modifications involving departures from the user's normal foods are no longer required, owing to use of the present incrementally-sized standard-sized eating-ware system and processes.

Most diet-altering plans concern themselves with the calorie intake. The incrementally-sized standard-sized eating-ware system recognizes the importance of how fast the substances are consumed in addition to the amount per each meal, to help the user feel satiated.

The incrementally-sized standard-sized eating-ware system and processes have applications for use in managing an individual's weight, as well as the weight of family members, such as spouses, children and other family members. As children are beginning to have more and more weight issues, accountable in part due to eating larger portion sizes than their body build requires, weight management and healthier eating habits are needed. Children using the incrementally-sized standard-sized eating-ware system and processes will learn to recognize an appropriate meal standard size for their body size and weight. This learning experience enables children to establish healthy eating habits that carry on into their adult lives.

A portion of a child's life is spent in the school system. Currently school cafeteria eating-ware is one-size-fits-all. This size is too large for many children and teaches them to eat more than they need. As a solution the schools are trying to provide more healthy choices yet more variety will only compound the issue. With the incrementally-sized standard-sized eating-ware system, cafeterias and other eateries can easily adjust the portion size to that which is right for the individual child.

The discrete nature of the incrementally-sized standard-sized eating-ware components, optional bowls, cups, etc., of the system allow parents to gradually decrease a child's portion amount without the child being adversely affected, or even aware of the small, incremental decrease.

When a child transitions from a child plate to an adult plate the surface area increases almost four times. We are asking children to make the right choices without giving them the right tools to make these choices. The incrementally-sized standard-sized eating-ware does provide these tools. Children can learn to adjust their incrementally-sized standard sizes as they grow and the incrementally-sized standard-sized eating-ware system and process adjust with their age throughout their life-span. Labeling foods in a cafeteria or a restaurant with the Caloric Density Mark will also help children make right choices from the start.

A family can lose weight together. Moreover, progressive eating-ware component standard sizes can be used to track and accommodate growth of children. The eating-ware component standard sizes can be increased gradually and unnoticeably, instead of progressing from "kiddy-sized" eating-ware components directly to adult-sized eating-ware components, which encourages overeating and may contribute to childhood obesity. In addition, schools, currently feed all children the same size portions on a single size tray or eating-ware component. School cafeterias could use different standard size eating-ware components to match the appropriate food portions with caloric needs of different age children.

Additionally utensil-like eating-ware of various standard sizes (SBS and/or SNS) can be offered for children to help them learn to eat at a slower consumption rate. Snacks and other pre-portioned items can use the incrementally-sized standard-sized eating-ware number system to help the consumers make the right choices throughout their day.

The incrementally-sized standard-sized eating-ware and system could be used as part of the treatment for eating disorders such as anorexia and bulimia. For example, anorexics have a distorted view of themselves and the amount of food they consume. Starting with a small eating-ware component, they could gradually become accustomed to larger and larger eating-ware components and portion standard sizes until reaching a healthy amount of food.

Other inventions that are used for measurement of food require that food is contained inside the measuring container. This type of measurement cannot be used to measure a flat surface. The act of measuring adds a cumbersome step that prevents many users from controlling the size of their standard portion and results in weight gain. The act of measurement will also make the users realize that they are depriving themselves in some way. The current size of typical eating-ware makes the appropriate food serving appear meager and the user feels deprived if they serve the right food standard portion to maintain optimal weight.

Figure 1B:
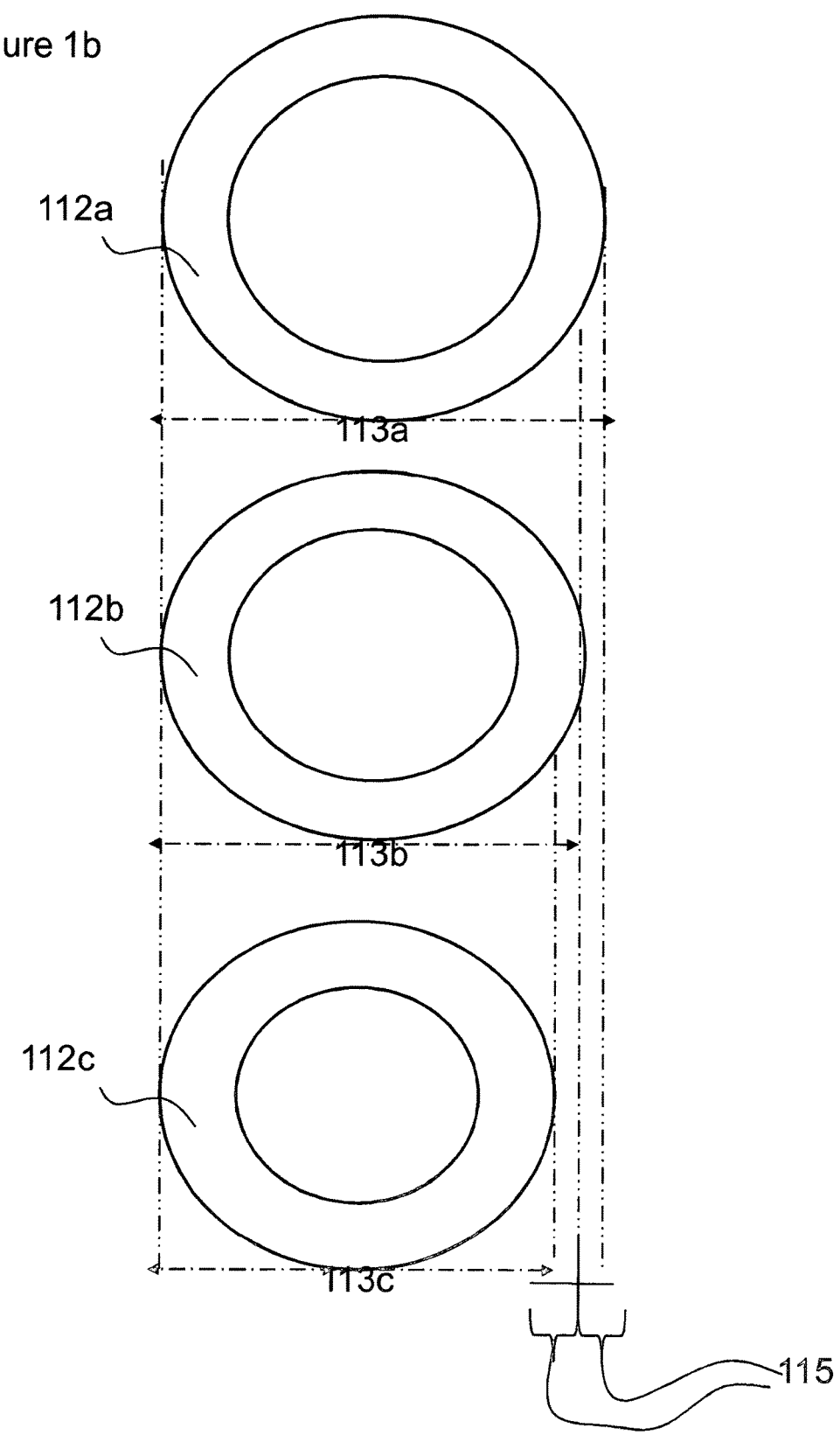

FIG. 1a illustrates a schematic view of a stack of flat round eating-ware components of the incrementally-sized standard-sized eating-ware system, while FIG. 1b illustrates a schematic view of some of the flat round incrementally-sized standard-sized eating-ware components separated from the set/stack of FIG. 1a. The incrementally-sized standard size eating-ware component is shown to look like a plate to demonstrate the—flat plate-like surface used for the formulas SPS and SSS and the incremental change 115 between standard sizes. The incrementally-sized standard-sized eating-ware system includes a plurality of incrementally-sized standard-sized eating-ware components 112a-112n having successively decreasing eating-ware component diameters $d_a$-$d_n$. Herein eating-ware components 112a, 112b and 112c are shown with eating-ware component diameters $d_a$, $d_b$, and $d_c$ shown herein at 113a, 113b and 113c, respectively.

The round flat standard-sized plate-like surfaces increasing in small increment diameters are used to establish the basis for the Standard Portion Size and Standard Snack Size. The illustrations in FIG. 1 refer to a standard-sized plate-like device to illustrate how any standard-sized eating-ware component would have its dimensions and size adjusted in small and/or proportionate increments between each standard size.

Eating-ware component diameters $d_a$-$d_n$, shown at 113a, 113b and 113c, of each of the incrementally-sized standard-sized eating-ware components 112a-112n are successively differentiated by an increment 115 to modify food portion intake delivered to a user. Increment 115 between successively decreasing eating-ware component diameters 112a, 112b and 112c ranges from 1/16 inch to a 1 inch increment. Preferably, increment 115 between successively decreasing eating-ware component diameters 112a, 112b and 112c ranges from 1/8 inch to a 1/2 inch increment. Most preferably, increment 115 between successively decreasing eating-ware component diameters 112a, 112b and 112c is 1/4 inch.

The 1/4 inch diameter increments of a round flat standard-sized plate-like surfaces form the basis for the whole number sizing of the Standard Portion Size of the incrementally-sized standard-sized eating-ware. The 1/8 inch diameter increments of a round flat standard-sized plate-like surfaces form the basis for the whole number sizing of the Standard Snack Size of the incrementally-sized standard-sized eating-ware.

The integer value of a standard size represents a range of volumes that have the same number in the integer place. The decimal value of a standard size represents a single volume equivalent for each size SPS, SSS, SBS, and/or SNS. Fractional incrementally-sized standard-sized eating-ware increments can be implemented to further limit the detectability by a user. These increments can be smaller than the 1/16 inch above.

When increment 115 is small, the eating-ware component volume and visa vie diameter changes or modifications are small so that shifting to the next or successive eating-ware component goes virtually unnoticed. The volume we are referring to is the total volumetric capacity directly above the flat round surface. The smaller diameter change results in a very gradual change in eating-ware component and visa vie portion size.

Similarly, the Standard Bite Size and Standard Nibble Size, which are mostly applied to incrementally-sized standard-sized eating-ware components that you eat with (transfer food directly into the user), follow similar design of incremental adjustments. The basis for these standard sizes is an elliptical surface. The total volumetric capacity for food delivery is defined by an ellipsoid formed around this surface. The increment 115 equivalent is not the diameter change, but a change in the minor radius of the ellipsoid (where both minor radii are equal). When radii increment is small, the eating-ware component total volumetric capacity for delivery of food are small so that shifting to the next or successive eating-ware component goes virtually unnoticed. The smaller radii change results in a very gradual change in eating-ware component and visa vie the amount of food delivered to the user per each mouthful, the rate of food delivery.

Another novel structural feature of the incrementally-sized standard-sized eating-ware system concerns the ability of the user to optimize his/her SBS and/or SNS. These two measures help the user establish how big a mouthful he/she needs to consume to feel satisfied. Also the process of optimizing the number of SBS and/or SNS per meal, per day, etc. gives the user a different way of managing his/her weight.

The incrementally-sized standard-sized eating-ware system and processes provide a weight loss program that focuses on incremental percent rate changes by automatically adjusting the portion served to a user. For example, for a flat round eating-ware component, change in area is equal to the following: change in area=pi/4($d_1^2$-$d_2^2$). Even though the change in eating-ware component diameter $d_1$-$d_2$ is constant, the rate at which the corresponding standard size' total volumetric capacity decreases is reduced in decreasing increments.

This is true for any round flat plate. As the user decreases each standard size (SPS and SSS) the "hurdle to the next standard size" (the amount of substance per one size reduction) decreases. This is motivating to the user and helps him/her attain and maintain his/her optimal weight.

This is also true for the utensil-like incrementally-sized standard-sized eating-ware components that are used to transfer food directly to the user. The incrementally-sized standard-sized eating-ware system and processes provide a weight loss program that not only focuses on incremental percent rate changes by automatically adjusting the portion served by a user, but also on incremental percent rate changes by automatically adjusting the rate the portion is transferred to a user. The amount of substance transferred per each transfer is dependent on the surface area of the utensil-like incrementally-sized standard-sized eating-ware. Standard Bite Size and Standard Nibble Size are based on a shape of a flat elliptically shaped spoon-like surface. As the minor radii decreases at a constant rate the volume decreases at a decreasing rate.

Figure 5:
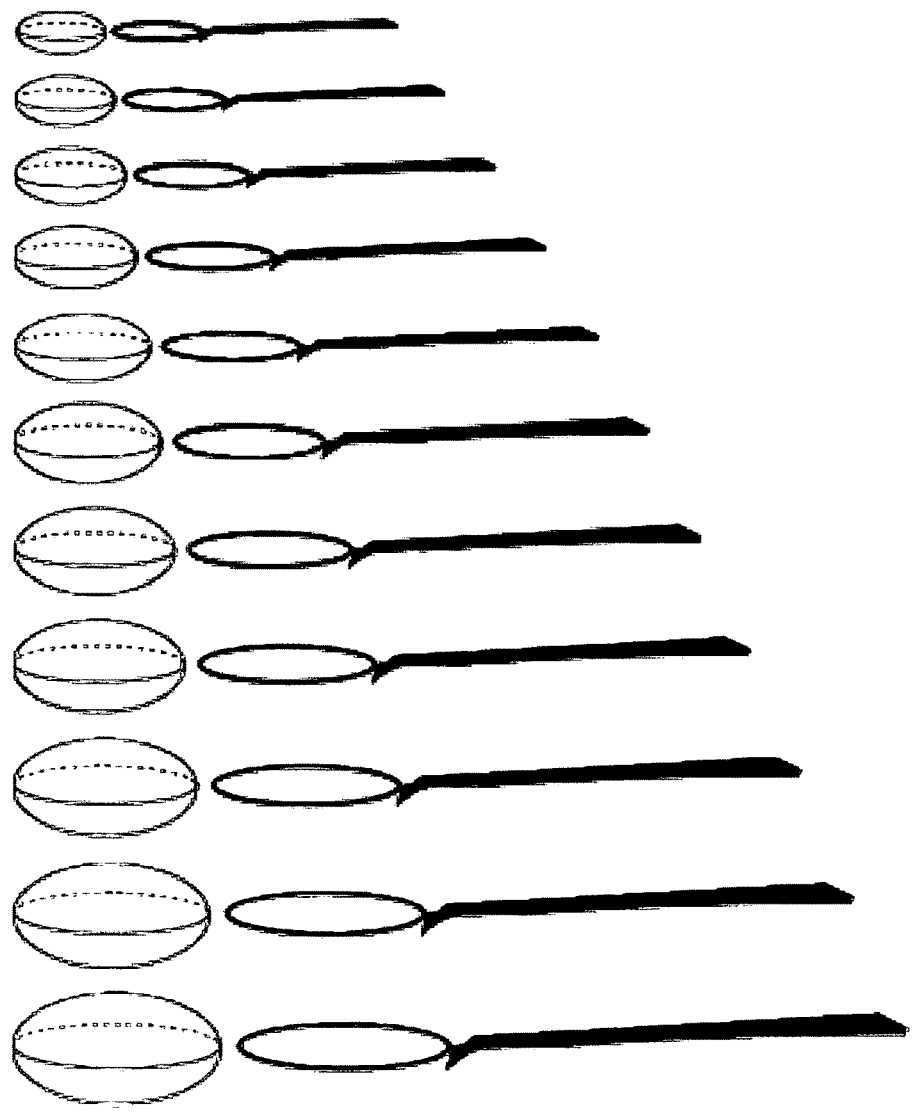
FIG. 5 illustrates a schematic view of incrementally-sized Standard Bite Size and/or Standard Nibble Size based on a flat elliptical surface.

The user who makes the planar view assessment of the food quantity experiences a constant change in diameter/radii yet the amount of food reduced per SPS, SSS, SBS, and/or SNS is gradually decreasing. This creates a smaller and smaller hurdle to pass and therefore continually motivates the user to stick to his/her weight management regimen. Example of a "standard bite size" and "standard nibble size" are illustrated in FIG. 5.

The incremental adjustments in the area of the eating-ware component change the total volumetric capacity of the eating-ware component, and therefore alter the total calories consumed. As an individual reduces their eating-ware component standard size using constant diameter changes, the amount of calories per each change in diameter is decreased. This is true for a flat round plate as well as an elliptical flat spoon. The advantage of the incrementally-sized standard-sized eating-ware system is that it works on the consumption process in two ways. One is the two-dimensional component of a surface that is adjusted at small increments, and therefore the user who makes visual assessment during the serving and the consumption processes experiences little emotional impact. This aspect is adjusted at a constant rate. The other is the three dimensional aspect which affects the amount of substance contained within the incrementally-sized standard-sized eating-ware component, which affects the amount of substance consumed and the rate that it is consumed. Both aspects add to the positive motivational impact on the user.

To demonstrate this feature of the incrementally-sized standard-sized eating-ware system, a round flat plate-like surface is used. For example, when the eating-ware component is reduced from 10 to 9.75 inch diameter, the area of the eating-ware component is reduced by 3.88 square inches. Going from 5 inches to 4.75 inches, the area is reduced by 1.91 square inches, which corresponds to half the reduction of calories, assuming everything else is constant. Table I and Table II below set forth the diameter of the eating-ware component, the corresponding area and change in area with incremental change in diameter of 1/4 inch for each sequential round eating-ware component, for Standard Portion Size and Standard Snack Size. The standard eating-ware component standard size dimensions assume a flat eating-ware component.

TABLE I

Standard Portion Size

| Whole Number | Round Flat Surface and/or Standard Portion Size | | | Volume of Incrementally Sized Cylinder | |
|---|---|---|---|---|---|
| Standard Portion Size SPS | Diameter (inches) | Area (in$^2$) | Change in Area (in$^2$) | with height = 1 inch in cubic inches | Change in volume per size change in inches cubed |
| 25 ... | | | | | |
| 24 | 10 | 78.54 | | 78.54 | |
| 23 | 9.75 | 74.66 | 3.88 | 74.66 | 3.88 |
| 22 | 9.5 | 70.88 | 3.78 | 70.88 | 3.78 |
| 21 | 9.25 | 67.20 | 3.68 | 67.20 | 3.68 |
| 20 | 9 | 63.62 | 3.58 | 63.62 | 3.58 |
| 19 | 8.75 | 60.13 | 3.49 | 60.13 | 3.49 |
| 18 | 8.5 | 56.74 | 3.39 | 56.74 | 3.39 |
| 17 | 8.25 | 53.46 | 3.29 | 53.46 | 3.29 |
| 16 | 8 | 50.27 | 3.19 | 50.27 | 3.19 |
| 15 | 7.75 | 47.17 | 3.09 | 47.17 | 3.09 |
| 14 | 7.5 | 44.18 | 2.99 | 44.18 | 2.99 |
| 13 | 7.25 | 41.28 | 2.90 | 41.28 | 2.90 |
| 12 | 7 | 38.48 | 2.80 | 38.48 | 2.80 |
| 11 | 6.75 | 35.78 | 2.70 | 35.78 | 2.70 |
| 10 | 6.5 | 33.18 | 2.60 | 33.18 | 2.60 |
| 9 | 6.25 | 30.68 | 2.50 | 30.68 | 2.50 |
| 8 | 6 | 28.27 | 2.41 | 28.27 | 2.41 |
| 7 | 5.75 | 25.97 | 2.31 | 25.97 | 2.31 |
| 6 | 5.5 | 23.76 | 2.21 | 23.76 | 2.21 |
| 5 | 5.25 | 21.65 | 2.11 | 21.65 | 2.11 |
| 4 | 5 | 19.63 | 2.01 | 19.63 | 2.01 |
| 3 | 4.75 | 17.72 | 1.91 | 17.72 | 1.91 |
| 2 | 4.5 | 15.90 | 1.82 | 15.90 | 1.82 |
| 1 | 4.25 | 14.19 | 1.72 | 14.19 | 1.72 |
| 0 | 4 | 12.57 | 1.62 | 12.57 | 1.62 |

TABLE II

Standard Snack Size

| Whole Number | Round Flat Surface and/or Standard Snack Size | | | Volume of Incrementally Sized Cylinder | |
|---|---|---|---|---|---|
| Standard Snack Size SSS | Diameter (inches) | Area (in$^2$) | Change in Area (in$^2$) | with height = 1 inch in cubic inches | Change in volume per size change in inches cubed |
| 25 ... | ... | ... | | ... | |
| 24 | 3 | 7.069 | ... | 7.069 | ... |
| 23 | 2.875 | 6.492 | 0.577 | 6.492 | 0.577 |
| 22 | 2.75 | 5.940 | 0.552 | 5.940 | 0.552 |
| 21 | 2.625 | 5.412 | 0.528 | 5.412 | 0.528 |
| 20 | 2.5 | 4.909 | 0.503 | 4.909 | 0.503 |
| 19 | 2.375 | 4.430 | 0.479 | 4.430 | 0.479 |
| 18 | 2.25 | 3.976 | 0.454 | 3.976 | 0.454 |
| 17 | 2.125 | 3.547 | 0.430 | 3.547 | 0.430 |
| 16 | 2 | 3.142 | 0.405 | 3.142 | 0.405 |
| 15 | 1.875 | 2.761 | 0.380 | 2.761 | 0.380 |
| 14 | 1.75 | 2.405 | 0.356 | 2.405 | 0.356 |
| 13 | 1.625 | 2.074 | 0.331 | 2.074 | 0.331 |
| 12 | 1.5 | 1.767 | 0.307 | 1.767 | 0.307 |
| 11 | 1.375 | 1.485 | 0.282 | 1.485 | 0.282 |
| 10 | 1.25 | 1.227 | 0.258 | 1.227 | 0.258 |
| 9 | 1.125 | 0.994 | 0.233 | 0.994 | 0.233 |
| 8 | 1 | 0.785 | 0.209 | 0.785 | 0.209 |
| 7 | 0.875 | 0.601 | 0.184 | 0.601 | 0.184 |
| 6 | 0.75 | 0.442 | 0.159 | 0.442 | 0.159 |
| 5 | 0.625 | 0.307 | 0.135 | 0.307 | 0.135 |
| 4 | 0.5 | 0.196 | 0.110 | 0.196 | 0.110 |
| 3 | 0.375 | 0.110 | 0.086 | 0.110 | 0.086 |
| 2 | 0.25 | 0.049 | 0.061 | 0.049 | 0.061 |
| 1 | 0.125 | 0.012 | 0.037 | 0.012 | 0.037 |
| 0 | 0 | 0 | 0.12 | 0 | 0.12 |

To demonstrate this feature of the incrementally-sized standard-sized eating-ware system we use a round flat plate-like surface. For example: Family of four starting a weight loss initiative together using round flat plates: Father 300 lbs (plate's standard size is 24 for 10" diameter flat round plate), mother 200 lbs (plate's standard size is 18 for 8.5" diameter flat round plate), child 1 170 lbs (plate's standard size is 16 for 8" diameter flat round plate), and child 2 150 lbs (plate's standard size is 14 for 7.5" diameter flat round plate). They all start with eating-ware component standard sizes they feel comfortable with; when they go to the sequential incrementally smaller eating-ware component standard size, their flat round plates each reduce in area by different amounts. The father goes down by 3.88 sq. in., the mother by 3.29 sq. in., child 1 by 3.09 sq. in., and child 2 by 2.90 sq. in. They can motivate each other by reducing the eating-ware components by one standard size, but the calorie reduction will be different for each person. Obesity tends to run in families. The eating-ware component standard size variety can help parents realize that children need an eating-ware component standard size that corresponds to their size.

A plurality of eating-ware components is provided to form a set of incrementally-sized standard-sized eating-ware components. For example, if using round flat plates, wherein the smallest flat plate has a diameter of 4 inches (smaller round-flat plate sizes can be represented by negative numbers or typically would be represented by SSS rather than SPS) and a last flat plate has a largest plate diameter of 10 inches (bigger diameters and their respective incremental sizes follow the same formula for establishing their standard size for SPS), and the flat round plates are consecutively decreased by an increment of ¼ inch, twenty-five incrementally-sized standard-sized eating-ware components are provided, as in the example hereinabove (see Table I).

An incrementally-sized standard-sized setting may consist of multiple components of each type of eating-ware. As an example, a dinner plate may have five optional incrementally-sized standard-sized round flat plates. For example, the smallest round flat plate can have a diameter of 7 inches. This may represent the smallest round flat plate in the main or dinner plate set for most purposes. As discussed hereinafter, smaller round flat plates can, optionally, be used as dinner plates for people that require a greater calorie restriction. The round flat plates are used to demonstrate the concept, other shapes and configurations can be adjusted in a similar manner with the main focus on small incremental changes especially with the planar view of the eating-ware.

The system may further comprise a plurality of incrementally-sized standard-sized minor round flat plates designed to be used for lunch, dessert, salads, appetizers, or bread. When using round flat plates, the smallest is at least 4 inches and represents size 0 of the standard Portion Size, with successive round flat plate standard sizes increasing via ¼ inch diameter increments. These smaller incrementally-sized standard sized round flat plates also have significance for serving children, and/or adults who need a larger reduction in weight.

Figure 7:
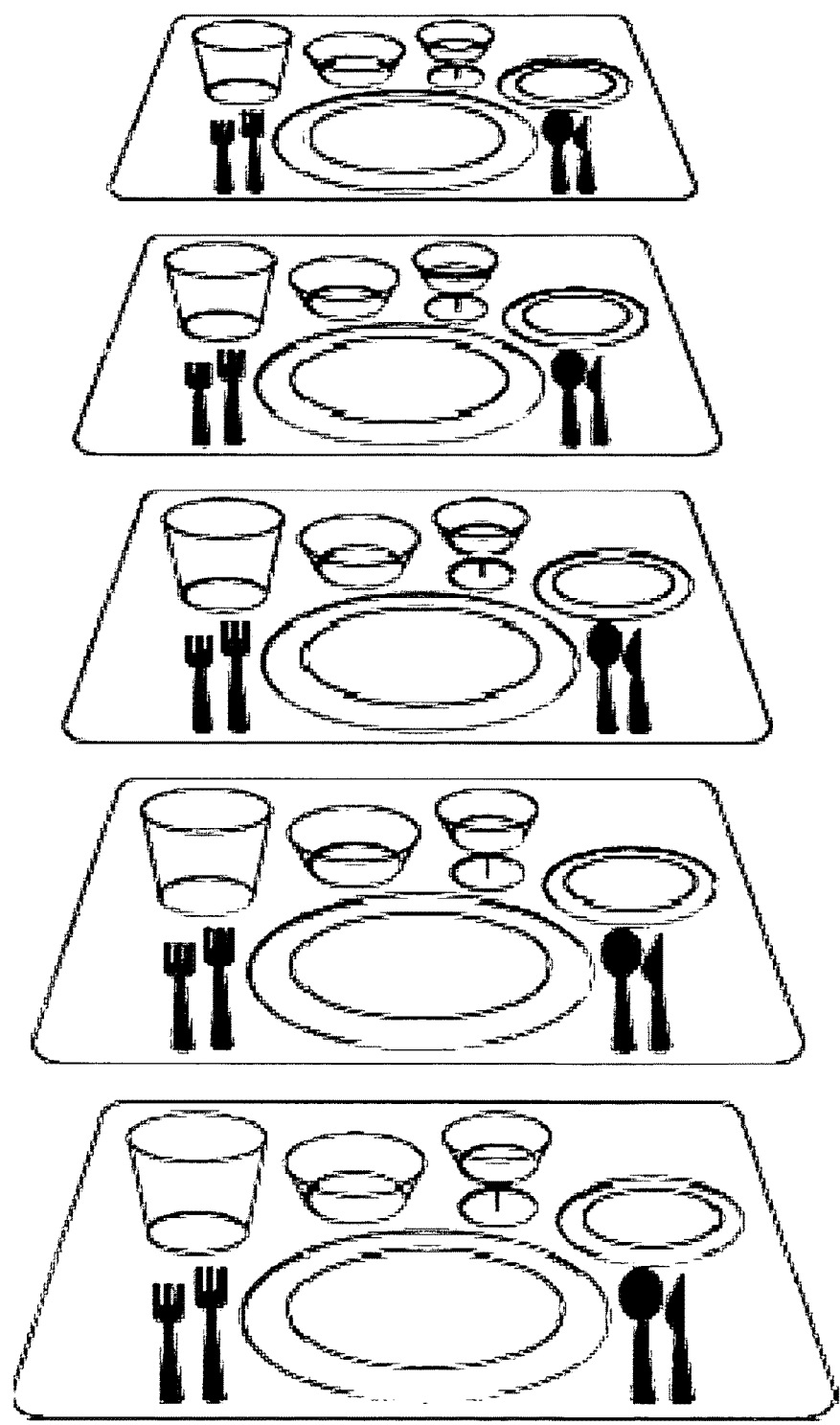
FIG. 7 illustrates a schematic view of incrementally-sized Standard Size settings.

For this type of setting arrangement there would be five optional incrementally-sized standard-sized salad plates, desert plates, bowls, cups and saucers, glasses, mugs, butter plates, utensils, cutlery, etc. see FIG. 7.

For the purpose of demonstrating an example of one process that can be implemented using the incrementally-sized standard-sized eating-ware for weight management we are using a flat round plate as an example of an incrementally-sized standard-sized eating-ware component. The user shifts from using a starting eating-ware component selected from the incrementally-sized standard-sized eating-ware components (See FIG. 1b) 112a-112n to the next, successive eating-ware component standard size at a designated time interval to correspondingly modify the food portion intake. The user continues to successively shift from eating-ware components within the incrementally-sized standard-sized eating-ware components 112a-112n until the user reaches a goal food portion or weight. The person using the eating-ware components 112a-112n would start with a dinner eating-ware component standard size closest to their current eating-ware component standard size (i.e. the starting eating-ware component) and decrease one eating-ware component standard size at each designated time interval, such as every few days, or once per week, or longer if necessary. The time interval can be self guided by the user or guided by a professional like a doctor or nutritional consultant.

The time interval can range from daily, weekly, monthly or at any other interval that is selected by the user to lose or gain weight at their own pace. With each new time interval, the user shifts to the next successive eating-ware component.

Other processes that can be used to implement the incrementally-sized standard-sized eating-ware such as:
  use the same standard sizes SPS, SSS, SBS, and/or SNS all day long (decreasing/increasing all 4 sizes after an interval of time);
  use the same standard sizes for each type of meal (decreasing/increasing all 4 sizes after an interval of time);
  use the same standard size for the type of food (decreasing/increasing all 4 sizes after an interval of time);
  use a set number of standard-sized bites/nibbles per day, per meal, etc., and adjusting that number after an interval of time;
  use a set number of standard-sized bites/nibbles per day, per meal, etc., and adjusting the standard sizes of bites/nibbles after an interval of time.

The incrementally-sized standard-sized eating-ware can be used as a program designed for weight management. The program can incorporate charts and/or software for selection and/or determination of factors that determine the transition rate of each consecutive standard size combination. Preferably, a chart designating the eating-ware component appointed for selection from the incrementally-sized standard-sized eating-ware components 112a-112n is provided for determining a user's starting eating-ware component standard size as well as their end-use/goal eating-ware component standard size depending on their goal weight. The goal eating-ware component standard size is especially well suited for long term use in order to maintain a desired weight. Various weight management factors are utilized to determine the starting eating-ware component and goal eating-ware component, as well as the rate of shifting between successive eating-ware components. These factors preferably include, in combination, height, weight, gender, and activity level. A chart of goal eating-ware component vs. clothing sized (based on a typical height-weight range) can also be provided to help dieters meet their goal. The time interval for shifting between eating-ware components, and whether a user shifts consecutively or skips eating-ware components, is partially determined by the rate of weight loss the user is seeking. If the user is seeking rapid weight loss, the user may utilize a shorter time interval between eating-ware components, and/or may even skip eating-ware components to use smaller standard sizes at a more accelerated rate, thereby facilitating cut-back on food portion amounts at a more accelerated rate.

Figure 2:
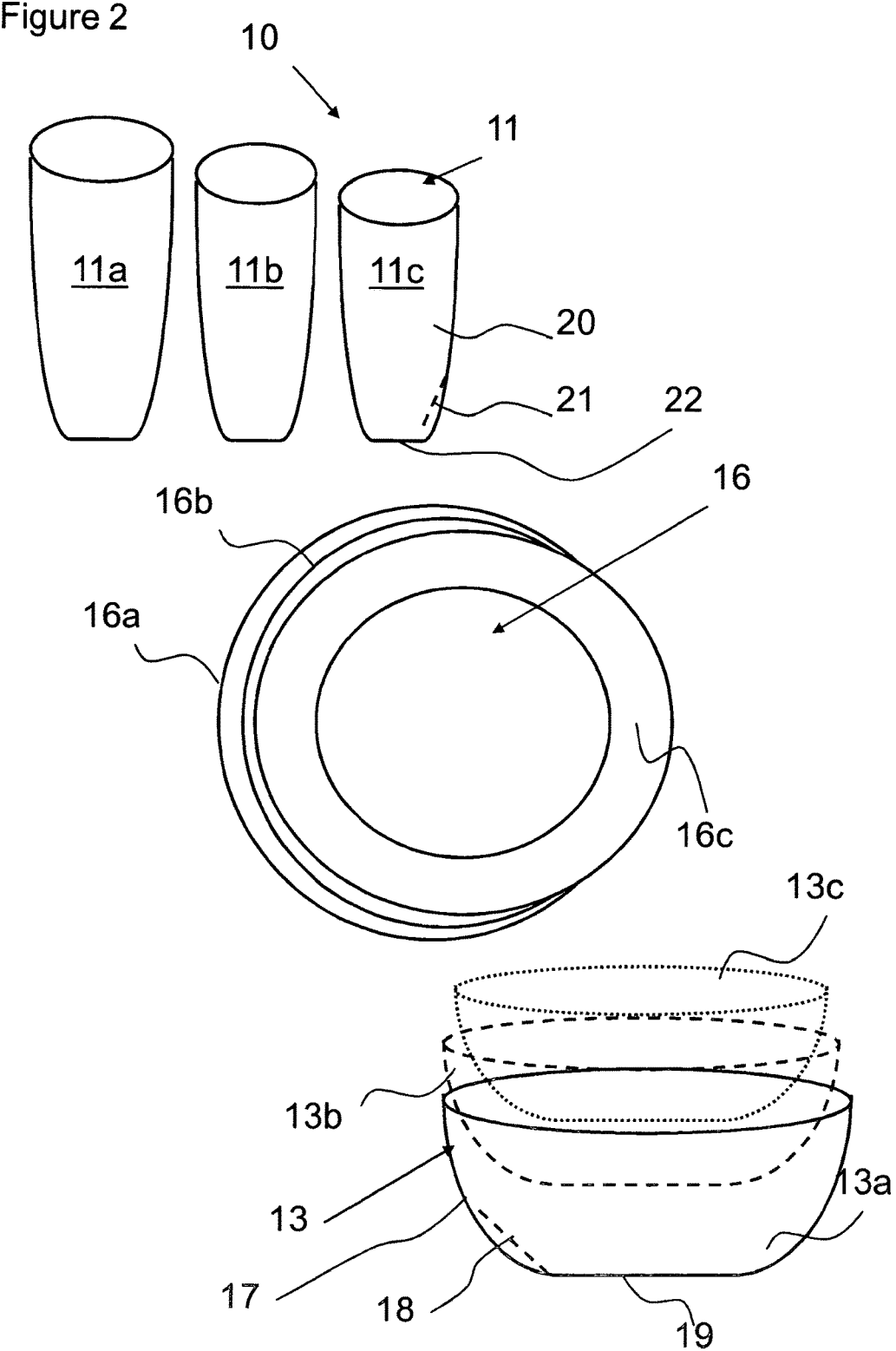
FIG. 2 illustrates a schematic view of an embodiment of the incrementally-sized standard-sized eating-ware system wherein the set further includes optional incrementally-sized standard sized glasses and bowls.

FIG. 2 shows how some of the incrementally-sized standard-sized eating-ware examples incrementally adjust in size. These adjustments in size, shape and/or configurations are made in such a way as to minimize the user's perception of change. FIG. 2 illustrates schematically an embodiment of the incrementally-sized standard-sized eating-ware system wherein a set of eating-ware components optionally includes incrementally-sized standard sized glasses and bowls, shown generally at 10. The incrementally-sized standard-sized eating-ware system may further comprise a plurality of incrementally-sized standard sized bowls 13a-13n, incrementally-sized standard sized salad round flat plates 16a-16n and/or incrementally-sized standard sized desert round flat plates corresponding to each of the plurality of incrementally-sized standard sized eating-ware components of FIG. 1, to form a plurality of incrementally-sized standard sized place settings a-n, as well as an optional plurality of incrementally-sized standard sized beverage containers 11a-11n. Incrementally-sized standard sized bowls 13a-13n comprise side walls 17 having a slope 18 and being oriented in relation to a bowl bottom 19 to form a bowl width. Each of bowls 13a-13n has an internal volume that incrementally differs by slightly adjusting slope 18, the height of side walls 17, and/or bowl bottom 19 to adjust the standard size. Bowls 13a-13n could start at standard size 0 and increase in small increments in various dimensions to help preserve undetectability between consecutive sizes. The bowls 13a-13n may include changing overall shape of the bowl and shapes and slopes of the sides in addition to the overall width in order to help reduce volume and decrease consumption while maintaining visually the perception that a larger quantity of food is contained within the bowl.

Incrementally-sized standard sized beverage containers 11a-11n are preferably selected from a group consisting of glasses, cups, or mugs. Beverage containers 11a-11n may successively decrease in height or/and in width and/or slope and/or shape to reduce the total volumetric capacity for each of the beverage containers 11a-11n to adjust the standard size.

Some users may find it easier to adjust their consumption intake by a constant reduction in total volumetric capacity. Therefore a fluid ounce or fractions of fluid ounce per each adjustment can create another process for a user to use. Although the standard sizes will not change at a constant increment, the amount of food and or rate of food transferred directly to the user can be adjusted at constant increments.

Each incrementally-sized standard-sized beverage container 11a-11n comprises a vessel having sides 20 arranged with a slope 21 in relation to a bottom 22, so that sides 20, slope 21, and/or bottom 22 may be incrementally reduced to create a total volumetric capacity reduction for each successive standard size change. These adjustments in size, shape and/or configurations are made in such a way as to minimize the user's perception of change. Beverage glassware (glasses, cups, mugs, etc.) 11a-11n could decrease in both height and width to reduce total volumetric capacity by standard size change. The shape and slope of the sides of the glassware 11a-11n can also be varied to control the volume of liquid, while minimizing the visual impact of the reduction.

Like incrementally-sized standard sized round flat plates 112a-112n of FIGS. 1a, 1b, the incrementally-sized standard sized place setting's bowls 13a-13n of FIG. 2, salad round flat plates 16a-16n and/desert round flat plates, and glasses 11a-11n are provided so that each member, bowl or glass, has different incremental standard sizes, 13a, 13b, 13c, 16a-16n and 11a, 11b, 11c, respectively, and delivers varying portion amounts. Through use of an incrementally-sized standard sized place setting, a user can set his or her table as usual, and when having dinner guests, the user will discretely continue on with his/her dieting goals.

Figure 3A:
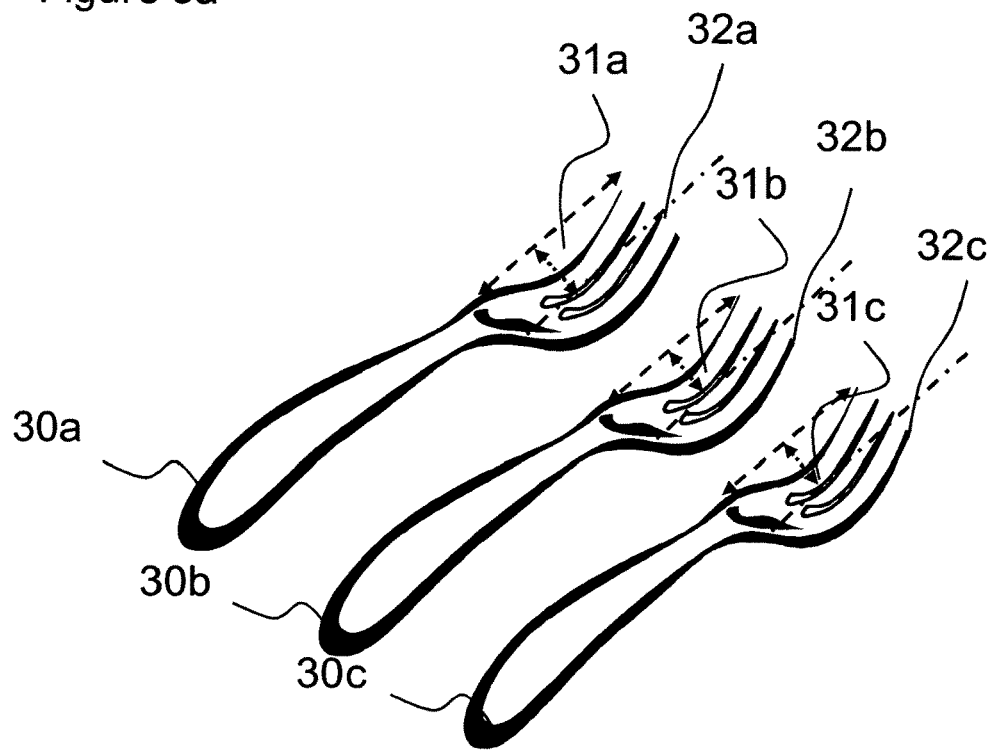
FIG. 3a illustrates a schematic view of optional incrementally-sized standard sized forks.
Figure 3B:
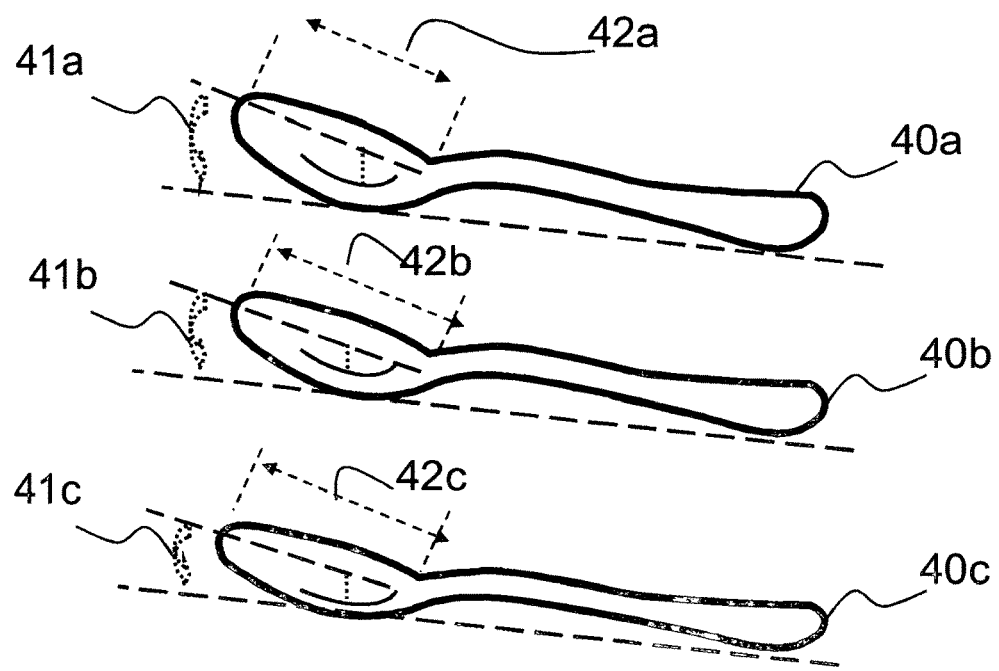
FIG. 3b illustrates a schematic view of optional incrementally-sized standard sized spoons.

FIGS. 3a and 3b illustrate schematic views of optional incrementally-sized standard sized utensils, including incrementally-sized standard sized forks and incrementally-sized standard sized spoons. Other utensil-like eating-ware components will follow a similar pattern of size adjustment. A plurality of incrementally-sized standard sized forks 30a-30n and/spoons 40a-40n may be provided for delivering incrementally successively smaller bite standard sizes to the user. As a result, the user will be forced to eat more slowly as each bite is decreased in volume from the user's normal bite standard size. Forks 30a-30n may deliver smaller bites based on incrementally reducing each fork's depth 31a-31n or by shortening prongs 32a-32n. In turn, spoons 40a-40n may deliver smaller spoonfuls based on incrementally reducing each spoons depth 41a-41n or by shortening scoop length 42a-42n or the width. These dimensional adjustments are done to the surface or body extension that actually delivers food directly to the user. This is the portion that controls the Standard Bite Size and/or Standard Nibble Size of the eating-ware component. Another important aspect of these utensil-like eating-ware components and other eating-ware accessories used as part of the incrementally-sized standard sized eating-ware setting are overall dimensions, including features that do not directly contain the food, for example, handles, place-mats, etc. The relative overall size needs to proportionally adjust so that the eating-ware size reduction is not glaringly obvious due to relative size change.

The gradual reduction in Standard Bite/Nibble Size will gradually reduce the user's rate of food consumption and result in the user feeling more satisfied with the incrementally-smaller sized standard portion he or she consumes. Another process of implementing the incrementally-sized standard-sized eating-ware system is adjusting the SBS and/or SNS at a different rate then the SPS and/or SSS. This may make a transition easier for some of the users since the number of mouthfuls per SPS and/or SSS will change with each adjustment in SBS and/or SNS.

Each of the eating-ware components, such as plates, bowls, minor plates, salad/dessert plates, cups, mugs, and glasses may include encouraging reinforcement indicia to motivate the user to continue on with their weight management plan and to shift to the next successive eating-ware component. To account for differences in eating-ware component capacity due to different shapes and dimensions, eating-ware component standard sizes based on total volumetric capacity ranges can be established and imprinted on the back of each eating-ware component for easy user identification. Moreover, a restaurant eating-ware component system may be provided wherein a plurality of incrementally-sized standard sized restaurant eating-ware components are presented with portion amounts that can be readily compared to the incrementally-sized standard-sized eating-ware components used in a user's home.

When the incrementally-sized standard-sized eating-ware system is globally implemented for all eating-ware components the users will be able to continue on their weight management routine no matter where they are eating. Until then tools like charts and/or software, etc. can be provided to the users for cross-reference of the eating-ware components the standard sizes SPS, SSS, SBS, and/or SNS.

The Incrementally-Sized Standard-Sized Eating-ware System includes a single Standard Sized eating-ware component with demarcations that indicates one or more Standard Sizes, which allows a single eating-ware component to guide the user with multiple Standard Sizes.

The Incrementally-Sized Standard-Sized Eating-ware System can comprise of a plurality of Standard Sized templates and related devices to be used with Non-Standard Sized eating-ware, that provide guidance concerning the equivalency to the Standard Sizes.

These templates and related devices can have indicia to indicate the equivalency to one or more of the Standard Sizes.

With this arrangement, the user can maintain his or her portion modification in a restaurant environment. A system of standard or relative eating-ware component standard sizes could be utilized in restaurants and other eateries so that people can compare restaurant eating-ware components and portions with their own goals, or with normally-used eating-ware component standard sizes. The ratio of the diameters, the ratio of surface areas, or a ratio of the estimated volumes of the restaurant eating-ware component to the standard-sized eating-ware component can be provided to diners. In addition, that ratio, or other suitable indicia such as standard-sized eating-ware component standard size, eating-ware component diameter, surface area, total volumetric capacity, or the like, can be designated on the bottom of each eating-ware component, to facilitate distribution of eating-ware component settings among family members having divergent eating-ware component standard size requirements. These indicia can be located anywhere on the eating-ware component or on a guide that is available to the user. The indicia may be represented by design, demarcation, color, shape, or texture that represent a standard size and not necessarily the numerical value itself.

The Incrementally-Sized Standard-Sized Eating-ware System Standard Sizes can be marked on eating-ware using any of the following representations with Standard Size and/or Standard Size Range represented by:
  a) encouraging reinforcement indicia,
  b) standard size/s numerical value (representing total volumetric capacity(ties) and/or total volumetric capacity range(s)),
  c) standard size represented by words like: small, medium, large . . . ,
  d) standard size represented by words like: queen, king, pawn . . . ,
  e) standard size represented by images: dots, animal shapes,
  f) other indicia that would indicate incrementally increasing or decreasing Standard Size and/or Standard Size Range,
  g) color and/or texture, and/or
  h) imprinted design: pictorial or graphic.

In addition, the Incrementally-Sized Standard-Sized Eating-ware System can include a series of eating-ware in which Standard Sizes and/or Standard Size Ranges are indicated by variation between components in:
  a) different colors,
  b) different shapes,
  c) different configurations, and/or
  d) different texture
of each component within a series.

The Incrementally-Sized Standard-Sized Eating-ware System can also comprise of a single eating-ware component, in which multiple Standard Sizes and/or Standard Size Ranges are indicated within that component by:
  a) encouraging reinforcement indicia,
  b) standard size/s numerical value (representing total volumetric capacity and/or total volumetric capacity range),
  c) standard size represented by words like: small, medium, large . . . ,
  d) standard size represented by words like: queen, king, pawn . . . ,
  e) standard size represented by images: dots, animal shapes,
  f) other indicia that would indicate incrementally increasing or decreasing Standard Size and/or Standard Size Range,
  g) color and/or texture, and/or
  h) imprinted design: pictorial or graphic.

The Incrementally-Sized Standard-Sized Eating-ware System can have eating-ware components that are manufactured to the standard-sized specifications and/or the system can be applied to existing eating-ware components via measurement and/or calculation of equivalent total volumetric capacity.

The incrementally-sized standard-sized eating-ware can be produced as permanent eating-ware components, composed of glass, ceramic, plastic, metal or the like. Alternatively, the incrementally-sized standard-sized eating-ware can be produced as a disposable product, composed of paper, Styrofoam, plastic, or the like. Different colors of incrementally-sized standard-sized eating-ware could be available. Research has shown that color influences appetite and food intake. Different color eating-ware components can be used to increase appetite for those who want to gain weight, and decrease appetite for those who want to lose weight. Eating-ware components can be indistinguishable so that a parent can modify food intake without the awareness of the family members. Different colors can be used to represent different standard sizes of the eating-ware components.

Advantageously, the incrementally-sized standard-sized eating-ware system and processes provides eating-ware components and/or eating-ware component sets designed to decrease or increase consumption of food or drink over time with minimal impact on the consumer. Visual perceptions and habits greatly influence the quantity of food/liquid consumed. The eating-ware comprises of components that have an established standard size, such as SPS, SSS, SBS and/or SNS as defined by the formulas and are available with multiple components incrementally sized for the user to adjust sequentially and/or at his/her own rate for the purpose of weight management. Eating-ware components comprise part of a set; the standard size of the eating-ware components change from set to set. Eating-ware component standard size changes occur in small increments, making it difficult to notice the changes from day to day, or week to week. This results in small changes in food amounts consumed and/or the rate at which consumer transfers food to him/herself and therefore the user can achieve gradual and unnoticeable reduction in food consumption and succeed in a healthy weight management. Small daily or weekly changes in increments utilized by the incrementally-sized standard-sized eating-ware system and processes minimize the discomfort and feelings of deprivation that many people experience when dieting. The eating-ware components are proportioned between each standard size so that the calorie intake is slowly reduced (or increased) and a person diets (or gains weight) without significant effort and/or the recognition that a change in caloric intake is occurring. Consumers using the eating-ware components of the incrementally-sized standard-sized eating-ware system and processes will gradually become accustomed to smaller (or larger) standard sized eating-ware components and glassware, and portions of food and drink. They will gradually adjust all eating-ware components to the standard size that will assist them in maintaining their optimal weight.

Counting calories and measuring out food portions is no longer necessary, nor are dietary modifications involving departures from the user's normal foods. Advantageously, the user simply adjusts his/her portion standard size at an individualized pace by shifting to the next eating-ware component standard size.

Preferably, there are four standard formulas for assigning standard sizes to eating-ware components. The user of eating-ware uses visual, mostly planar view assessment of his/her portion relative to the eating-ware he/she is using to determine an adequate portion size. This is the reason why a planar surface of a flat plate-like round shape was used as the basis for two of the standard sizes, Standard Portion Size (SPS) and Standard Snack Size (SSS). For the same reason the planar surface of a spoon-like elliptical shape was used as the basis for the other two of the standard sizes, Standard Bite Size (SBS) and Standard Nibble Size (SNS).

Figure 4:
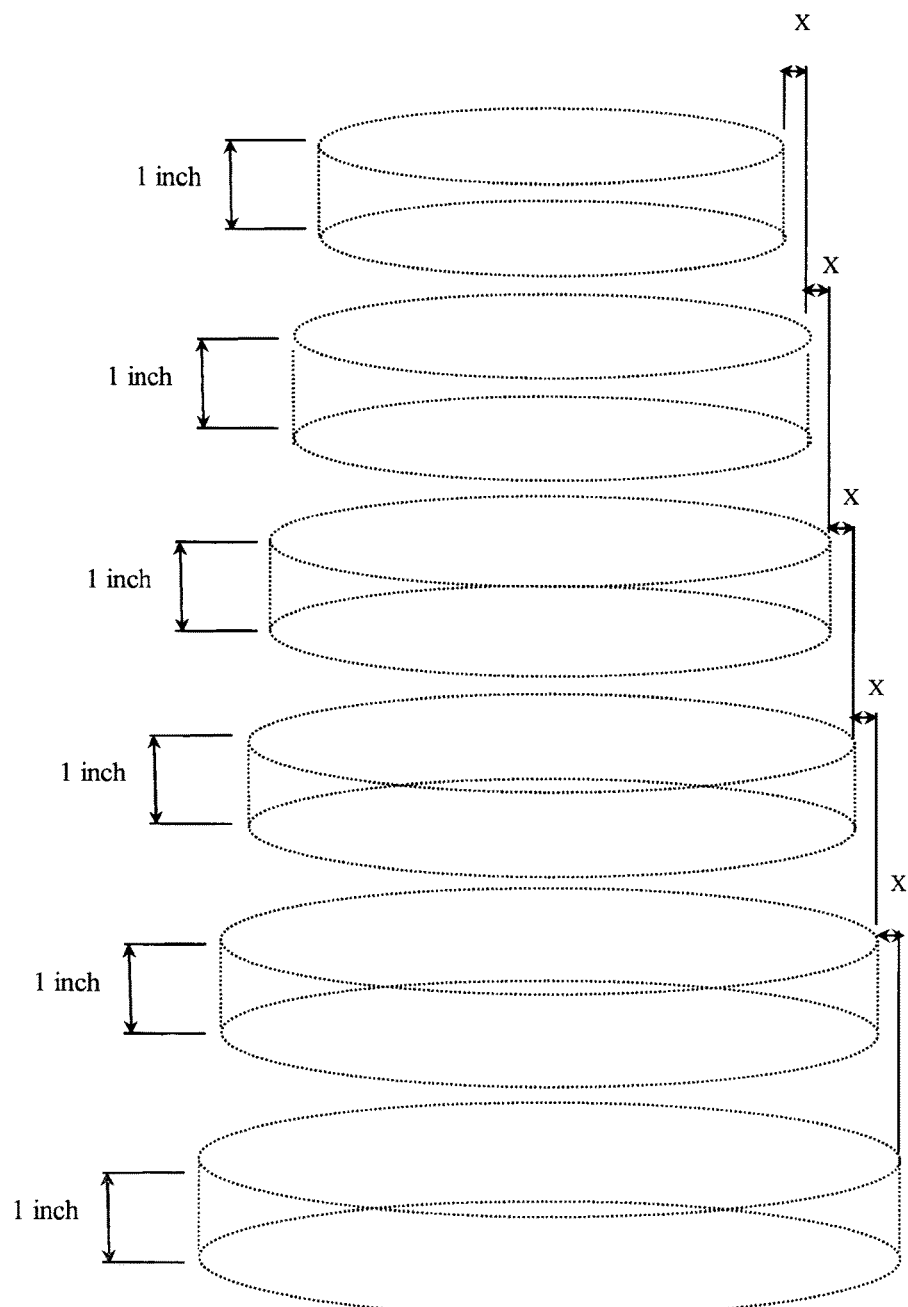
FIG. 4 illustrates a schematic view of incrementally-sized Standard Portion Size (SPS) and incrementally-sized Standard Snack Size (SSS), where a single integer increment in size of SPS represents the diameter incremental increase of 2*X=¼ inch and the single integer increment in size of SSS represents the diameter incremental increase of 2*X=⅛ inch, and where the smallest diameter for SPS is 4 inches and for SSS=0 inches.

FIG. 4 illustrates a schematic view of incrementally-sized Standard Portion Size (SPS) and incrementally-sized Standard Snack Size (SSS).

FIG. 5 illustrates a schematic view of incrementally-sized Standard Bite Size (SBS) and incrementally sized Standard Nibble Size (SNS).

Figure 6:
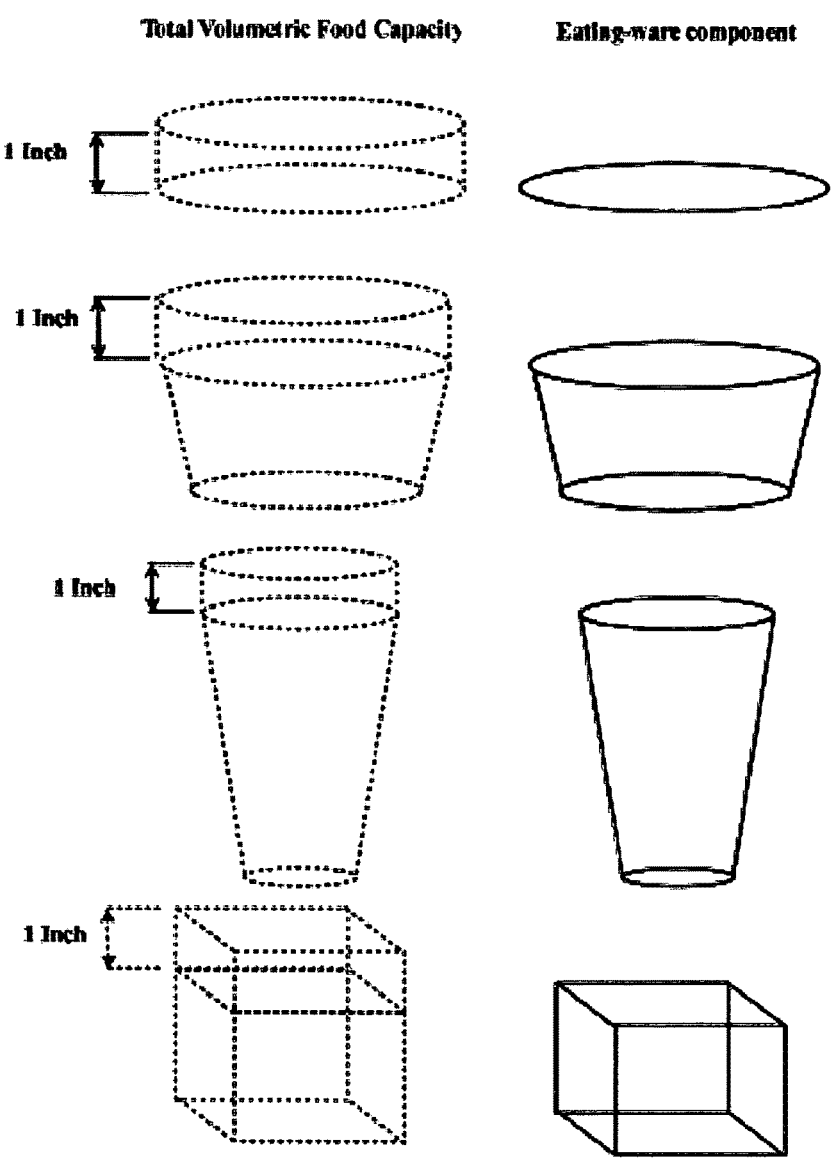
FIG. 6 illustrates the standard-sized eating-ware total volumetric food delivery capacity and relationship between variously shaped standard-sized eating-ware components.

FIG. 6 illustrates the standard-sized eating-ware total volumetric food delivery capacity of variously shaped standard-sized eating-ware components.

FIG. 7 illustrates a schematic view of incrementally-sized Standard Size settings.

FIG. 8 illustrates a schematic planar view of the illusion created by a food portion placed on round flat surfaces that increase in diameter. This illusion leads to portion size distortion, whereby the portions appear smaller and smaller as the round flat surface increases even though the portion size remains constant.

Any of the Incrementally-Sized Standard-Sized Eating-ware System Standard Sizes can be expressed in terms of the other three Standard Sizes based on each other's equivalent total volumetric capacity.

Each of the Incrementally-Sized Standard-Sized Eating-ware System Standard Sizes may be expressed by a quantity of other Standard Size portions of food where:
a) the Standard Portion Size can be expressed as a quantity of Standard Snack Sizes based on the equivalent total volumetric capacity values and vice versa;
b) the Standard Bite Size can be expressed as a quantity of Standard Nibble Sizes based on the equivalent total volumetric capacity values and vice versa;
c) the Standard Portion Size and/or Standard Snack Size can be expressed in terms of a quantity of Standard Bite Sizes and/or Standard Nibble Sizes, based on equivalent total volumetric capacity values and vice versa.

Formulas

The formulas/calculations define relationships between various standard-sized eating-ware components and the standard sizes. The Incrementally-Sized Standard Sized eating-ware components can be used inter-changeably through selection of equivalent size eating-ware of corresponding Standard Size and/or Standard Size Range such as:
(a) different sizes of a given type and style of component,
(b) different sizes of the same type but different styles of components,
(c) different types of the same style of components, and/or
(d) different types and styles of component.

Standard Portion Size (SPS), is a standard sized eating-ware total volumetric food delivery capacity of a cylindrical space of 1 inch height directly above a flat round surface, where the diameter is equal to 4 inches or greater. The SPS=0 is equivalent to a 4" diameter, 1 inch high standard portion. Each consecutive integer SPS is defined by an increment of ¼ inch increase in diameter of the cylinder base; for example standard portion that is 4.25 inches in diameter and 1 inch high is SPS=1, 4.5 inches in diameter and 1 inch high is SPS=2. and so on. Whole number SPS refers to a range of volumes that have the same integer portion of their value. A decimal Standard Portion Sizes can be interpolated in between the integer SPS values and refer to a single standard-sized volume.

The Standard Portion Size is a numeric representation of a 1 inch high cylinder space enveloped above a round flat surface. The Area ($A_{SPS}$) of horizontal cross-section of a Standard Portion Size is a circle:

$$A_{SPS} = \pi \times d^2/4$$

where d is 4 inches at standard size 0 and increases by ¼ of inch per each increment in whole number standard size and $\pi$ is a constant.

The volume $V_{SPS}$ of Standard Portion Size: the volume of a cylinder where height of the cylinder is constant at 1 inch times the area $A_{SPS}$:

$$V_{SPS} = \pi \times d^2/4 \times 1$$

The equivalent Standard Portion Size $S_{SPS}$ of any eating-ware component and/or for any volume can be determined as long as the surface area of the rim of the eating-ware component and the component's internal volume can be established. The volume of the surface of the rim area in inches squared is multiplied by 1 inch to obtain the volume directly above the eating-ware component. That volume is added to the internal volume of the eating-ware component (both in cubic inches). The total volume than is compared to an equivalent volume of the Standard Portion Size (SPS) and that corresponding size is assigned to the eating-ware component. The Standard Portion Size $S_{SPS}$ can be calculated as follows:

$$S_{SPS} = (\text{the diameter of a cylinder in inches} - 4) \times 4$$

The Standard Snack Size (SSS) is a standard-sized eating-ware total volumetric food delivery capacity of a cylindrical space of 1 inch height directly above a flat round surface, where the diameter is equal to 0 inches or greater. The SSS of 0 is equivalent to 0" diameter, 1 inch high standard snack (food) portion. Each consecutive integer SSS is defined by an increment of ⅛ inch increase in diameter of the cylinder base; for example standard portion that is 0.125 inches in diameter and 1 inch high is SSS-1, 0.25 inches in diameter and 1 inch high is SSS=2. and so on. Whole number SSS refers to a range of volumes that have the same integer portion of their value. A decimal Standard Snack Sizes can be interpolated in between the integer SSS values and refer to a single standard-sized volume.

The Area $A_{SSS}$ of horizontal cross-section of Standard Snack Size is a circle:

$$A_{SSS} = \pi \times d^2/4$$

where d is 0 inches at standard size 0 and increases by ⅛ of inch per each increment in whole number standard size and $\pi$ is a constant.

The volume $V_{SSS}$ of Standard Snack Size is a volume of a cylinder where height of the cylinder is constant at 1 inch times the area $A_{SSS}$:

$$V_{SSS} = \pi \times d^2/4 \times 1$$

The equivalent Standard Snack Size of any eating-ware component and/or for any volume can be determined as long as the surface area of the rim of the eating-ware component and the components internal volume can be established. The volume of the surface of the rim area in inches squared is multiplied by 1 inch to obtain the volume directly above the eating-ware component. That volume is added to the internal volume of the eating-ware component (both in cubic inches). The total volume then is compared to an equivalent volume of the Standard Snack Size (SSS) and that corresponding size is assigned to the eating-ware component.

Standard Snack Size $S_{SSS}$ for a cylinder represented by a round flat surface can be calculated as follows:

$$S_{SSS} = \text{the diameter of a cylinder in inches} \times 8$$

Standard Bite Size is defined by the standard-sized eating-ware total volumetric food delivery capacity of an ellipsoid where both minor radii equal to 0.25 inches or greater and the major radius equals (1.5 times the minor radius) plus 0.125. The SBS=0 is equivalent to a standard-size food portion of a volume of an ellipsoid that has minor radii equal to 0.25". The total volumetric food delivery capacity equivalent for each consecutive integer SBS is defined by an increment of 0.025 inch increase in minor radii. Whole number SBS refers to a range of volumes that have the same integer portion of their value. A decimal Standard Bite Sizes can be interpolated in between the integer SBS values and refer to a single standard-sized volume. Standard Bite Size Formulas:

Area $A_{SBS}$ of horizontal cross-section of a Standard Bite Size is an ellipse:

$$A_{SBS} = \pi \times r_m \times r_M$$

where $r_m$ refers to the minor radius $r_M$ refers to the major radius and $\pi$ is a constant:

$$r_M = 1.5 \times r_m + 0.125$$

$$A_{SBS} = 1.5\pi \times r_m^2 + 0.125 \times \pi \times r_m$$

Volume $V_{SBS}$ of the ellipsoid where both minor radiuses are equal to each other is:

$$V_{SBS} = 4/3 \times \pi \times r_m \times r_m \times r_M$$

where $$r_M = 1.5 \times r_m + 0.125$$

$$V_{SBS} = 2 \times \pi \times r_m^3 + \tfrac{1}{6} \times \pi \times r_m^2$$

Standard Bite Size (SBS) can be calculated as follows:

$$S_{SBS} = (r_m + r_M - 0.75)/0.0625$$

where $$r_M = 1.5 \times r_m + 0.125$$

$$S_{SBS} = 40 \times r_m - 10$$

$$r_m = (S_{SBS} + 10)/40$$

Table IIIa and Table IIIb below set forth the diameter to eating-ware component area and change in area and volume for each incremental changes for Standard Bite Size.

TABLE IIIa

Standard Bite Size Part a
Standard Bite Size

| Whole Number Standard Bite Size | Minor Radius $r_m$ in inches | Major Radius $r_M$ in inches | Area of Ellipse in inches squared | Volume of Incrementally-sized Standard-Sized Eating-ware Ellipsoid in inches cubed | Delta A- change in area per size in inches squared | Delta V- change in volume per size in inches cubed |
|---|---|---|---|---|---|---|
| 25 ... | | | | | | |
| 24 | 0.8500 | 1.40000 | 3.7384953 | 4.23696129 | 0.20715 | 0.35248 |
| 23 | 0.8250 | 1.36250 | 3.5513465 | 3.88448114 | 0.20126 | 0.33239 |
| 22 | 0.8000 | 1.32500 | 3.3300882 | 3.55209409 | 0.19537 | 0.31288 |
| 21 | 0.7750 | 1.28750 | 3.1347204 | 3.23921110 | 0.18948 | 0.29397 |
| 20 | 0.7500 | 1.25000 | 2.9452431 | 2.94524311 | 0.18359 | 0.27564 |
| 19 | 0.7250 | 1.21250 | 2.7616563 | 2.66960108 | 0.17770 | 0.25791 |
| 18 | 0.7000 | 1.17500 | 2.5839600 | 2.41169596 | 0.17181 | 0.24076 |
| 17 | 0.6750 | 1.13750 | 2.4121541 | 2.17093870 | 0.16592 | 0.22420 |
| 16 | 0.6500 | 1.10000 | 2.2462387 | 1.94674025 | 0.16002 | 0.20823 |
| 15 | 0.6250 | 1.06250 | 2.0862139 | 1.73851156 | 0.15413 | 0.19285 |
| 14 | 0.6000 | 1.02500 | 1.9320795 | 1.54566359 | 0.14824 | 0.17806 |
| 13 | 0.5750 | 0.98750 | 1.7838356 | 1.36760728 | 0.14235 | 0.16385 |
| 12 | 0.5500 | 0.95000 | 1.6414822 | 1.20375359 | 0.13646 | 0.15024 |
| 11 | 0.5250 | 0.91250 | 1.5050192 | 1.05351346 | 0.13057 | 0.13722 |
| 10 | 0.5000 | 0.87500 | 1.3744468 | 0.91629786 | 0.12468 | 0.12478 |
| 9 | 0.4750 | 0.83750 | 1.2497648 | 0.79151772 | 0.11879 | 0.11293 |
| 8 | 0.4500 | 0.80000 | 1.1309734 | 0.67858401 | 0.11290 | 0.10168 |
| 7 | 0.4250 | 0.76250 | 1.0180724 | 0.57690768 | 0.10701 | 0.09101 |
| 6 | 0.4000 | 0.72500 | 0.9110619 | 0.48589966 | 0.10112 | 0.08093 |
| 5 | 0.3750 | 0.68750 | 0.8099419 | 0.40497093 | 0.09523 | 0.07144 |
| 4 | 0.3500 | 0.65000 | 0.7147123 | 0.33353242 | 0.08934 | 0.06254 |
| 3 | 0.3250 | 0.61250 | 0.6253733 | 0.27099509 | 0.08345 | 0.05423 |
| 2 | 0.3000 | 0.57500 | 0.5419247 | 0.21676989 | 0.07756 | 0.04650 |
| 1 | 0.2750 | 0.53750 | 0.4643667 | 0.17026778 | 0.07167 | 0.03937 |
| 0 | 0.2500 | 0.50000 | 0.3926991 | 0.13089969 | | |

TABLE IIIb

Standard Bite Size Part b
Standard Bite Size

| Whole Number Standard Bite Size | Area of Ellipse in inches squared | Volume of Incrementally-sized Standard-Sized Eating-ware Ellipsoid in inches cubed | Delta A-change in area per size in inches squared | Delta V-change in volume per size in inches cubed | Rate of change of Delta A-change in area per size | Rate of change of Delta V-change in volume per size |
|---|---|---|---|---|---|---|
| 25 ... | | | | | | |
| 24 | 3.7384953 | 4.23696129 | 0.20715 | 0.35248 | 0.00589 | 0.02009 |
| 23 | 3.5313465 | 3.88448114 | 0.20126 | 0.33239 | 0.00589 | 0.01950 |
| 22 | 3.3300882 | 3.55209409 | 0.19537 | 0.31288 | 0.00589 | 0.01892 |
| 21 | 3.1347204 | 3.23921110 | 0.18948 | 0.29397 | 0.00589 | 0.01833 |
| 20 | 2.9452431 | 2.94524311 | 0.18359 | 0.27564 | 0.00589 | 0.01774 |
| 19 | 2.7616563 | 2.66960108 | 0.17770 | 0.25791 | 0.00589 | 0.01715 |
| 18 | 2.5839600 | 2.41169596 | 0.17181 | 0.24076 | 0.00589 | 0.01656 |
| 17 | 2.4121541 | 2.17093870 | 0.16592 | 0.22420 | 0.00589 | 0.01597 |
| 16 | 2.2462387 | 1.94674025 | 0.16002 | 0.20823 | 0.00589 | 0.01538 |
| 15 | 2.0862139 | 1.73851156 | 0.15413 | 0.19285 | 0.00589 | 0.01479 |
| 14 | 1.9320795 | 1.54566359 | 0.14824 | 0.17806 | 0.00589 | 0.01420 |
| 13 | 1.7838356 | 1.36760728 | 0.14235 | 0.16385 | 0.00589 | 0.01361 |
| 12 | 1.6414822 | 1.20375359 | 0.13646 | 0.15024 | 0.00589 | 0.01302 |
| 11 | 1.5050192 | 1.05351346 | 0.13057 | 0.13722 | 0.00589 | 0.01244 |
| 10 | 1.3744468 | 0.91629786 | 0.12468 | 0.12478 | 0.00589 | 0.01185 |
| 9 | 1.2497648 | 0.79151772 | 0.11879 | 0.11293 | 0.00589 | 0.01126 |
| 8 | 1.1309734 | 0.67858401 | 0.11290 | 0.10168 | 0.00589 | 0.01067 |
| 7 | 1.0180724 | 0.57690768 | 0.10701 | 0.09101 | 0.00589 | 0.01008 |
| 6 | 0.9110619 | 0.48589966 | 0.10112 | 0.08093 | 0.00589 | 0.00949 |
| 5 | 0.8099419 | 0.40497093 | 0.09523 | 0.07144 | 0.00589 | 0.00890 |
| 4 | 0.7147123 | 0.33353242 | 0.08934 | 0.06254 | 0.00589 | 0.00831 |
| 3 | 0.6253733 | 0.27099509 | 0.08345 | 0.05423 | 0.00589 | 0.00772 |
| 2 | 0.5419247 | 0.21676989 | 0.07756 | 0.04650 | 0.00589 | |
| 1 | 0.4643667 | 0.17026778 | 0.07167 | 0.03937 | | |
| 0 | 0.3926991 | 0.13089969 | | | | |

Standard Bite Size can be determined for a non-standard eating-ware components and/or for any volume: 1) The non-standard eating-ware component internal volume $V_I$ is measured; 2) The cross-sectional area of top of the non-standard eating-ware component is measured and the area $A_{N\text{-}Bite}$ is calculated; and 3) The corresponding $r_m$ is calculated for the non-standard area $A_{N\text{-}Bite}$ and is $r_{mN}$ $$A_{N\text{-}Bite} = 1.5\pi \times r_{mN}^2 + 0.125 \times \pi \times r_{mN}$$

$$1.5\pi \times r_{mN}^2 + 0.125 \times \pi \times r_{mN} - A_{N\text{-}Bite} = 0$$

For a Quadratic equation:

$$ax^2 + bx + c = 0$$

$$x = (-b + \text{SQRT}(b^2 - 4 \times a \times c))/2 \times a$$

$$a = 1.5\pi$$

$$b = 0.125 \times \pi$$

$$c = -A_{N\text{-}Bite}$$

$$r_{mN} = (-(0.125 \times \pi) + \text{SQRT}((0.125 \times \pi)^2 - 4 \times (1.5\pi) \times (-A_{N\text{-}Bite})))/(2 \times 1.5\pi)$$

The corresponding volume of non-standard eating-ware $V_{NE}$ (external volume directly above the non-standard area is equal to the volume of ½ the ellipsoid formed by an equivalent standard area) is calculated for the $r_{mN}$ and it represents a volume the half of a standard equivalent ellipsoid volume that would be directly above the standard size area equivalent to $A_{N\text{-}Bite}$.

Standard Bite Size volume:

$$V_{SBS} 2 \times \pi \times r_m^3 + \tfrac{1}{6} \times \pi \times r_m^2$$

½ of the ellipsoid of the equivalent Standard Bite Size:

$$V_{NE} = \pi \times r_{mN}^3 + \tfrac{1}{12} \times \pi \times r_{mN}^2$$

The corresponding $V_{NE}$ is added to the internal volume of the non-standard eating-ware component for a total volume $V_{NT}$:

$$V_{NT} = V_I + V_{NE}$$

The corresponding $r_{mT}$ is calculated using the cubic equation for $V_{NT}$ and/or any known volume:
For a Cubic equation:

$$ax^3 + bx^2 + cx + d = 0$$

$$x = -(b/3a) - (C/3a) - ((b^2 - 3ac)/3aC)$$

$$V_{NT} = 2 \times \pi \times r_{mT}^3 + \tfrac{1}{6} \times \pi \times r_{mT}^2$$

$$2 \times \pi \times r_{mT}^3 + \tfrac{1}{6} \times \pi r_{mT}^2 - V_{NT} = 0$$

$$Q = \sqrt{(2b^3 - 9abc + 27a^2d)^2 - 4(b^2 - 3ac)^3}$$

$$C = \square[\tfrac{1}{2} \times (Q + 2b^3 - 9abc + 27a^2d)]$$

$$a = 2 \times \pi$$

$$b = \tfrac{1}{6} \times \pi$$

$$c = 0$$

$$d = -V_{NT}$$

$$Q = \sqrt{(2(\tfrac{1}{6} \times \pi)^3 + 27(2 \times \pi)^2 \times (-V_{NT}))^2 - 4((\tfrac{1}{6} \times \pi)^2)^3}$$

$$C = \square \frac{1}{2} \times ([\sqrt{2(\frac{1}{6}\times\pi)^3 + 27(2\times\pi)^2 \times (-V_{NT})})^2 - 4((\frac{1}{6}\times\pi)^2)^3] + 2(\frac{1}{6}\times\pi)^3 + 27(2\times\pi)^2 \times (-V_{NT}))$$

$$x = -(b/3a) - (C/3a) - ((b^2 - 3ac)/3aC)$$

$$r_{mT} = -[(\frac{1}{6}\times\pi)/3(2\times\pi)] - [C/3(2\times\pi)] - ((\frac{1}{6}\times\pi)^2/3(2\times\pi)C)$$

The corresponding $S_{NT}$ is calculated for the $V_{NT}$ and/or any known volume based on:

$$S_{NT} = 40 \times r_{mT} - 10$$

The Standard Nibble Size is generally defined by the standard-sized eating-ware total volumetric food delivery capacity of an ellipsoid where both minor radii equal to 0 inches or greater and the major radius equals 1.5 times the minor radius. The SNS=0 is equivalent to a standard-size food portion of a volume of an ellipsoid that has a minor radius equal to 0". The total volumetric food delivery capacity equivalent for each consecutive integer SNS is defined by an increment of 0.0125 inch increase in minor radii. Whole number SNS refers to a range of volumes that have the same integer portion of their value. A decimal Standard Nibble Size can be interpolated in between the integer SNS values and refer to a single standard-sized volume.

Standard Nibble Size Formulas:

$A_{SNS}$ is the area of horizontal cross-section of Standard Nibble Size (SNS) which is an ellipse, where $r_m$ is the minor radius and $r_M$ is the major radius with the formula for area:

$$A_{SNS} = \pi \times r_m \times r_M$$

where:

$$r_M = 1.5 \times r_m$$

$$A_{SNS} = 1.5\pi \times r_m^2$$

Volume of Standard Nibble Size (SNS) is an ellipsoid where both minor radiuses are equal to each other:

$$V_{SNS} = 4/3 \times \pi \times r_m \times r_m \times r_M$$

where $$r_M = 1.5 \times r_m$$

$$V_{SNS} = 2 \times \pi \times r_m^3$$

Standard Nibble Size (SNS):
where $$r_M = 1.5 \times r_m$$

$$S_{SNS} = 80 \times r_m$$

Table IVa and Table IVb below set forth the diameter to eating-ware component area and change in area and volume for each incremental changes for Standard Nibble Size.

TABLE IVa

Standard Nibble Size Part a
Standard Nibble Size

| Whole Number Standard Nibble Size | Minor Radius $r_m$ in inches | Major Radius $r_M$ in inches | Area of Ellipse in inches squared | Volume of Incrementally-sized Standard-Sized Eating-ware Ellipsoid in inches cubed | Delta A-change in area per size in inches squared | Delta V-change in volume per size in inches cubed |
|---|---|---|---|---|---|---|
| 25 . . . | | | | | | |
| 24 | 0.3000 | 0.45000 | 0.4241150 | 0.16964600 | 0.03461 | 0.02033 |
| 23 | 0.2875 | 0.43125 | 0.3895084 | 0.14931155 | 0.03313 | 0.01864 |
| 22 | 0.2750 | 0.41250 | 0.3563744 | 0.13067062 | 0.03166 | 0.01702 |
| 21 | 0.2625 | 0.39375 | 0.3247131 | 0.11364957 | 0.03019 | 0.01547 |
| 20 | 0.2500 | 0.37500 | 0.2945243 | 0.09817477 | 0.02872 | 0.01400 |
| 19 | 0.2375 | 0.35625 | 0.2658082 | 0.08417259 | 0.02724 | 0.01260 |
| 18 | 0.2250 | 0.33750 | 0.2385647 | 0.07156941 | 0.02577 | 0.01128 |
| 17 | 0.2125 | 0.31875 | 0.2127938 | 0.06029158 | 0.02430 | 0.01003 |
| 16 | 0.2000 | 0.30000 | 0.1884956 | 0.05026548 | 0.02283 | 0.00885 |
| 15 | 0.1875 | 0.28125 | 0.1656699 | 0.04141748 | 0.02135 | 0.00774 |
| 14 | 0.1750 | 0.26250 | 0.1443169 | 0.03367395 | 0.01988 | 0.00671 |
| 13 | 0.1625 | 0.24375 | 0.1244365 | 0.02696125 | 0.01841 | 0.00576 |
| 12 | 0.1500 | 0.22500 | 0.1060288 | 0.02120575 | 0.01694 | 0.00487 |
| 11 | 0.1375 | 0.20625 | 0.0890936 | 0.01633383 | 0.01546 | 0.00406 |
| 10 | 0.1250 | 0.18750 | 0.0736311 | 0.01227185 | 0.01399 | 0.00333 |
| 9 | 0.1125 | 0.16875 | 0.0596412 | 0.00894618 | 0.01252 | 0.00266 |
| 8 | 0.1000 | 0.15000 | 0.0471239 | 0.00628319 | 0.01104 | 0.00207 |
| 7 | 0.0875 | 0.13125 | 0.0360792 | 0.00420924 | 0.00957 | 0.00156 |
| 6 | 0.0750 | 0.11250 | 0.0265072 | 0.00265072 | 0.00810 | 0.00112 |
| 5 | 0.0625 | 0.09375 | 0.0184078 | 0.00153398 | 0.00663 | 0.00075 |
| 4 | 0.0500 | 0.07500 | 0.0117810 | 0.00078540 | 0.00515 | 0.00045 |
| 3 | 0.0375 | 0.05625 | 0.0066268 | 0.00033134 | 0.00368 | 0.00023 |
| 2 | 0.0250 | 0.03750 | 0.0029452 | 0.00009817 | 0.00221 | 0.00009 |
| 1 | 0.0125 | 0.01875 | 0.0007363 | 0.00001227 | 0.00074 | 0.00001 |
| 0 | 0.0000 | 0.00000 | 0.0000000 | 0.00000000 | | |

TABLE IVb

Standard Nibble Size Part b
Standard Nibble Size

| Whole Number Standard Nibble Size | Area of Ellipse in inches squared | Volume of Incrementally-sized Standard-Sized Eating-ware Ellipsoid in inches cubed | Delta A-change in area per size in inches squared | Delta V-change in volume per size in inches cubed | Rate of change of Delta A-change in area per size | Rate of change of Delta V-change in volume per size |
|---|---|---|---|---|---|---|
| 25 . . . | | | | | | |
| 24 | 0.4241150 | 0.16964600 | 0.03461 | 0.02033 | 0.00147 | 0.00169 |
| 23 | 0.3895084 | 0.14931155 | 0.03313 | 0.01864 | 0.00147 | 0.00162 |
| 22 | 0.3563744 | 0.13067062 | 0.03166 | 0.01702 | 0.00147 | 0.00155 |
| 21 | 0.3247131 | 0.11364957 | 0.03019 | 0.01547 | 0.00147 | 0.00147 |
| 20 | 0.2945243 | 0.09817477 | 0.02872 | 0.01400 | 0.00147 | 0.00140 |
| 19 | 0.2658082 | 0.08417259 | 0.02724 | 0.01260 | 0.00147 | 0.00133 |
| 18 | 0.2385647 | 0.07156941 | 0.02577 | 0.01128 | 0.00147 | 0.00125 |
| 17 | 0.2127938 | 0.06029158 | 0.02430 | 0.01003 | 0.00147 | 0.00118 |
| 16 | 0.1884956 | 0.05026548 | 0.02283 | 0.00885 | 0.00147 | 0.00110 |
| 15 | 0.1656699 | 0.04141748 | 0.02135 | 0.00774 | 0.00147 | 0.00103 |
| 14 | 0.1443169 | 0.03367395 | 0.01988 | 0.00671 | 0.00147 | 0.00096 |
| 13 | 0.1244365 | 0.02696125 | 0.01841 | 0.00576 | 0.00147 | 0.00088 |
| 12 | 0.1060288 | 0.02120575 | 0.01694 | 0.00487 | 0.00147 | 0.00081 |
| 11 | 0.0890936 | 0.01633383 | 0.01546 | 0.00406 | 0.00147 | 0.00074 |
| 10 | 0.0736311 | 0.01227185 | 0.01399 | 0.00333 | 0.00147 | 0.00066 |
| 9 | 0.0596412 | 0.00894618 | 0.01252 | 0.00266 | 0.00147 | 0.00059 |
| 8 | 0.0471239 | 0.00628319 | 0.01104 | 0.00207 | 0.00147 | 0.00052 |
| 7 | 0.0360792 | 0.00420924 | 0.00957 | 0.00156 | 0.00147 | 0.00044 |
| 6 | 0.0265072 | 0.00265072 | 0.00810 | 0.00112 | 0.00147 | 0.00037 |
| 5 | 0.0184078 | 0.00153398 | 0.00663 | 0.00075 | 0.00147 | 0.00029 |
| 4 | 0.0117810 | 0.00078540 | 0.00515 | 0.00045 | 0.00147 | 0.00022 |
| 3 | 0.0066268 | 0.00033134 | 0.00368 | 0.00023 | 0.00147 | 0.00015 |
| 2 | 0.0029452 | 0.00009817 | 0.00221 | 0.00009 | 0.00147 | |
| 1 | 0.0007363 | 0.00001227 | 0.00074 | 0.00001 | | |
| 0 | 0.0000000 | 0.00000000 | | | | |

Standard Nibble Size can be determined for a non-standard Nibble size eating-ware component and/or for any volume: 1) The non-standard eating-ware component internal volume $V_I$ is measured; 2) The cross-sectional area of top of the eating-ware component is measured and/or calculated the area $A_{N\text{-}Nibble}$ is calculated; and 3) The corresponding $r_m$ is calculated for the non-standard area $A_{N\text{-}Nibble}$ and is $r_{mN}$ $$A_{N\text{-}Nibble} = 1.5\pi \times r_{MN}^2$$

$$r_{mN} = \sqrt{(A_{N\text{-}Nibble}/(1.5\pi))}$$

The corresponding $V_{NE}$ (external volume directly above the non-standard area is equal to the volume of ½ the ellipsoid formed by an equivalent standard area) is calculated for the $r_{mN}$ and it represents a volume the half of an ellipsoid volume that would be directly above the standard size area equivalent to $A_{N\text{-}Nibble}$ Standard Nibble Size volume:

$$V_{Nibble} = 2 \times \pi \times r_{mN}^3$$

½ of an ellipsoid of the equivalent:

$$V_{NE} = \pi \times r_{mN}^3$$

The corresponding $V_{NE}$ is added to the internal volume of the non-standard eating-ware component for a total volume $V_{NT}$:

$$V_{NT} = V_I + V_{NE}$$

The corresponding $r_{mT}$ is calculated using the cubic equation for $V_{NT}$ and/or any known volume:

$$V_{NT} = 2 \times \pi \times r_{mNT}^3$$

$$r_{mNT} = \square(V_{NT}/(2\times\pi))$$

The corresponding $S_{NT}$ is calculated for the $V_{NT}$ and/or any known volume based on:

$$S_{Nibble} = 80 \times r_m$$

$$S_{Nibble} \times 80 \times \square(V_{NT}/(2\times\pi))$$

A significant aspect of this invention is that the user can use the eating-ware components interchangeably. The Incrementally-Sized Standard-Sized Eating-ware System eating-ware components with the same Standard Size can be used interchangeably, and this interchangeability is independent of the type, style and/or configuration of eating-ware. The user can continue to stick to his/her weight management regimen regardless of how he/she eats as long as he/she uses the Incrementally-Sized Standard-Sized Eating-ware System eating-ware components with the same Standard Size.

In the Incrementally-Sized Standard-Sized Eating-ware System, any eating-ware and it's Standard Size and/or Range and/or related total volumetric capacity equivalents can be listed or identified in books, guides, software, charts, menus, signs, labels, or external packaging indicia.

The Incrementally-Sized Standard-Sized Eating-ware System can include serving-ware where the internal volume contains the exact total volumetric capacity of a specific Standard Size, or it contains indicia indicating multiple Standard Sizes contained within. For example a soup ladle can be of a specific Standardized size or be able to dispense a standardized size volumetric equivalent of soup or contain markings of multiple standard sizes. A brownie tray can indicate marking of a standard size squares for example.

Although the volumetric shapes of a cylinder and an ellipsoid surrounding a flat elliptical surface have been used to establish standard sizes for food amounts, standard sizes can be established using other volumetric shapes, for example a hemisphere, a cone or a frustrum of a cone, and will be considered to be included within the scope of this invention.

The four Standard Sizes defined within will work well for most users. Some users may need a more customized transition between each incremental change. The Incrementally-Sized Standard-Sized Eating-ware System includes a series of Standard Sized eating-ware presented in a way that the rate of change in the total volumetric capacity decreases or increases between each increment:

a) at an increasing rate,
b) at a decreasing rate,
c) at a constant rate, or
d) at a variable rate.

The Incrementally-Sized Standard-Sized Eating-ware System includes a series of Standard Sized eating-ware, where the eating-ware's internal and/or external dimensions and/or configurations, including depth, height, slope of the walls, wall thickness, internal texture, shape of the inside, shape of the bottom, and/or a combination of some or all of the above, are varied in small increments to control the rate at which the incremental difference in total volumetric capacity between successive eating-ware in the series increases/decreases/remains constant/or is varied/customized to the user needs.

Having thus described the invention in rather full detail, it will be understood that such detail need not be strictly adhered to. For example, the eating-ware component geometry can be circular, oval, polygonal or the like. Substantially any incrementally-sized standard-sized eating-ware geometry that permits incremental changes to be made in the surface area and total volumetric capacity of the incrementally-sized standard-sized eating-ware, is intended to fall within the scope of the invention. Additional changes and modifications may suggest themselves to one skilled in the art, for example, the invention is suitable for use with eating-ware components, such as plates, bowls, drink-ware, utensils, any item that can be used to serve and eat food directly from and/or any item that can be used to transfer food directly to user's mouth, etc. having a round, oval, square, cylindrical, cubic, or polygonal configuration. Incrementally-Sized Standard-Sized Eating-ware System eating-ware components can have any regular or irregular configuration, since an equivalent Standard Size can be determined established and/or assigned for any eating-ware component.

These and other modifications which become apparent to those skilled in the art are intended to fall within the scope of the invention as defined by the subjoined claims.

What is claimed is:

1. A method, comprising:
    selecting a plate with a surface area within a range of 11-13 in$^2$ and designating the selected plate as a zero on a whole-number numerical index;
    selecting a plate increment between 1/16-inch and 1 inch;
    starting at one, designating a whole number (N) in the index to correspond with a plate having a first dimension equal to the plate increment plus a first dimension of a corresponding plate (N−1);
    providing a series of different-sized plates, each successive-sized plate's first dimension differing from its series neighbor by the plate increment;
    on each of the series of different-sized plates, marking an indicia representing the plate's relative position in a hierarchical order of the index;
    assigning a value of zero on the whole-number numerical index to a utensil with an ellipsoid circumscribing a food-carrying portion of the utensil, the ellipsoid having equal minor radii of 0.25 inches and a major radius of 0.5 inches;
    selecting a positive utensil increment of 0.025 inches or less , the increment being an increment of a minor radius of an ellipsoid with equal minor radii and a major radius equal to 1.5 times the minor radii plus 0.125 inches, the ellipsoid circumscribing a food-carrying portion of a utensil;
    providing a series of different-sized eating utensils, each successive-sized utensil differing from its series neighbor by the utensil increment;
    starting at one, designating a whole number (N) in the index to correspond with a utensil having a first minor radius equal to the utensil increment plus the minor radius of a corresponding utensil (N−1); and
    on each of the series of different-sized utensils, marking an indicia representing the utensil's relative position in the hierarchical order of the index using the same indicia that the plates are marked with.

2. The method according to claim 1, wherein the indicia comprise words of different sized chess pieces.

3. The method according to claim 1, wherein the indicia comprise shapes of different-sized animals.

4. The method according to claim 1, wherein the indicia comprise the index values.

5. The method according to claim 1, wherein each of the eating utensils is one of a fork and spoon.

6. The method according to claim 1, further comprising:
    measuring a volume of a pre-packaged and/or pre-measured amount of food;
    if the volume of the pre-packaged and/or pre-measured amount of food is less than a volume of a largest plate in the series of different-sized plates, the volume of the largest plate being calculated using the largest plate's area and a 1 inch height, determining which plate in the series of different-sized plates has a closest-but-larger volume using the plate's area and a 1 inch height;
    determining the determined plate's relative position in the hierarchical order of the index; and
    marking packaging of the pre-packaged and/or pre-measured amount of food with an indicia representing the determined plate's relative position in the hierarchical order of the index.

7. The method according to claim 6, wherein the indicia comprise words of different sized chess pieces.

8. The method according to claim 6, wherein the indicia comprise shapes of different-sized animals.

9. The method according to claim 6, wherein the indicia comprise the index values.

* * * * *